United States Patent [19]
Osugi

[11] Patent Number: 5,905,584
[45] Date of Patent: May 18, 1999

[54] HOLOGRAM RECORDING AND REPRODUCING APPARATUS

[75] Inventor: Yukihisa Osugi, Nagoya, Japan

[73] Assignee: NGK Insulators, Ltd., Japan

[21] Appl. No.: 08/774,173

[22] Filed: Dec. 26, 1996

[30] Foreign Application Priority Data

Dec. 26, 1995 [JP] Japan .................................. 7-339088
Dec. 26, 1995 [JP] Japan .................................. 7-350821

[51] Int. Cl.⁶ ..................................................... G03H 1/02
[52] U.S. Cl. ................................... 359/3; 359/7; 359/32
[58] Field of Search ................................. 359/3, 7, 32, 35

[56] References Cited

U.S. PATENT DOCUMENTS

| 3,652,145 | 3/1972 | Thaxter | 359/7 |
| 4,138,189 | 2/1979 | Huignard et al. | 359/7 |
| 4,674,824 | 6/1987 | Goodman et al. | 359/7 |

FOREIGN PATENT DOCUMENTS

| 55-15159 | 2/1980 | Japan | 359/35 |

*Primary Examiner*—Cassandra Spyrou
*Assistant Examiner*—Darren E. Schuberg
*Attorney, Agent, or Firm*—Parkhurst & Wendel

[57] ABSTRACT

In a hologram recording and reproducing apparatus including a hologram record element having a record unit formed by a photorefractive single crystal and a pair of electrodes provided on the record unit for applying a voltage to said record unit, and an optical system for impinging light onto an incident surface of the record unit, the record unit is made of a (100) wafer of $Bi_{12}SiO_{20}$ or $Bi_{12}GeO_{20}$ optical single crystal belonging to a cubic system, the light is made incident upon the (100) incident surface such that an optical axis of the incident light is inclined with respect to <100> axis of the optical single crystal by an angle θ of 30°–60°. The hologram record unit is immersed in an optically transparent and electrically insulating medium having a refractive index which differs from a refractive index of the optical single crystal by not larger than 0.50, the medium being contained in a vessel made of an optically transparent and electrically insulating material.

19 Claims, 18 Drawing Sheets

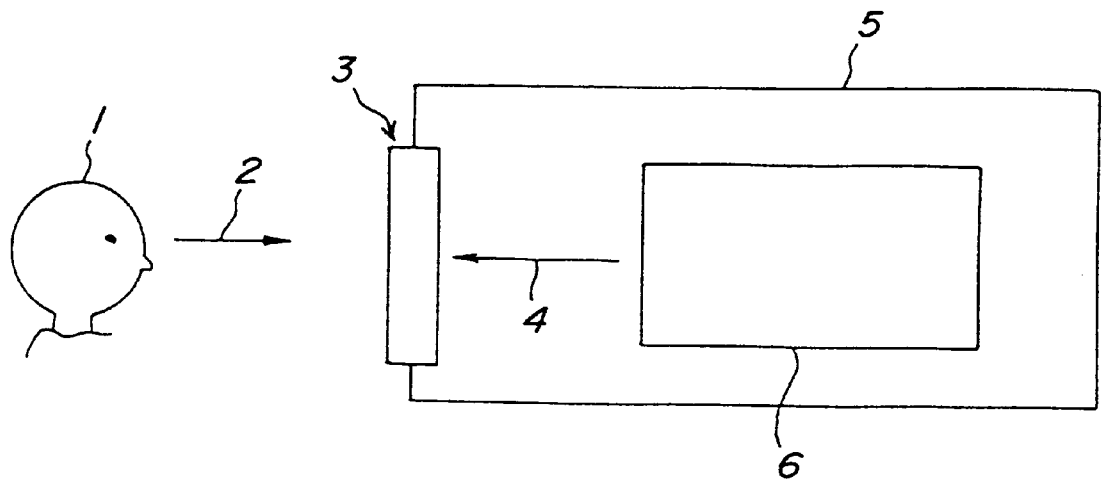
FIG_1A
PRIOR ART
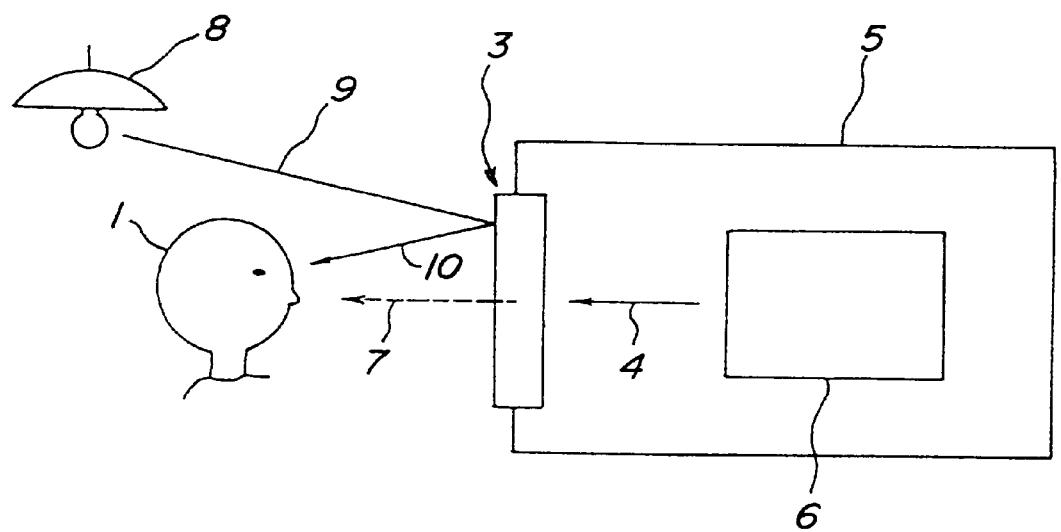
FIG_1B
PRIOR ART

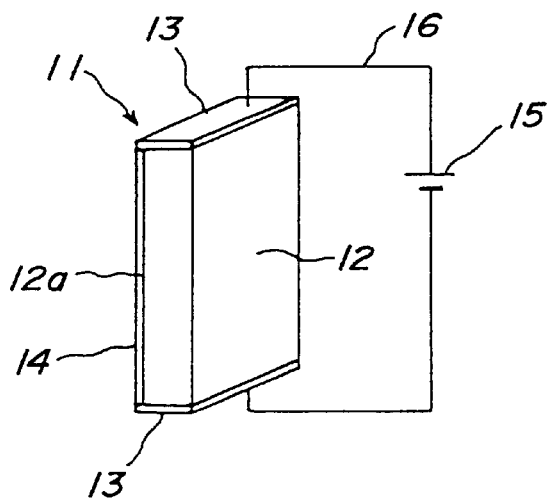
FIG_2
PRIOR ART
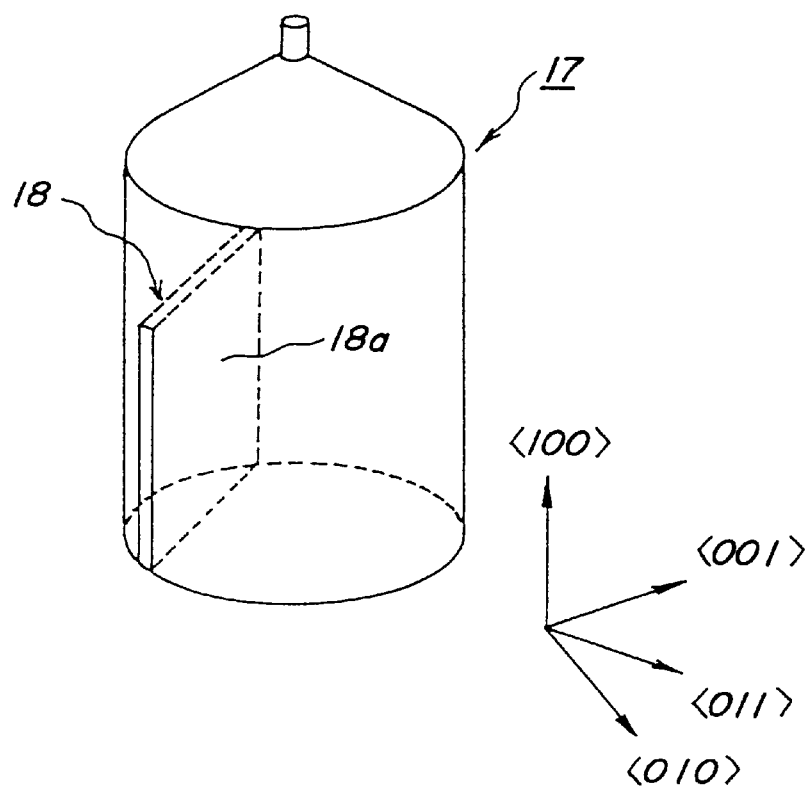
FIG_3
PRIOR ART

FIG_4A
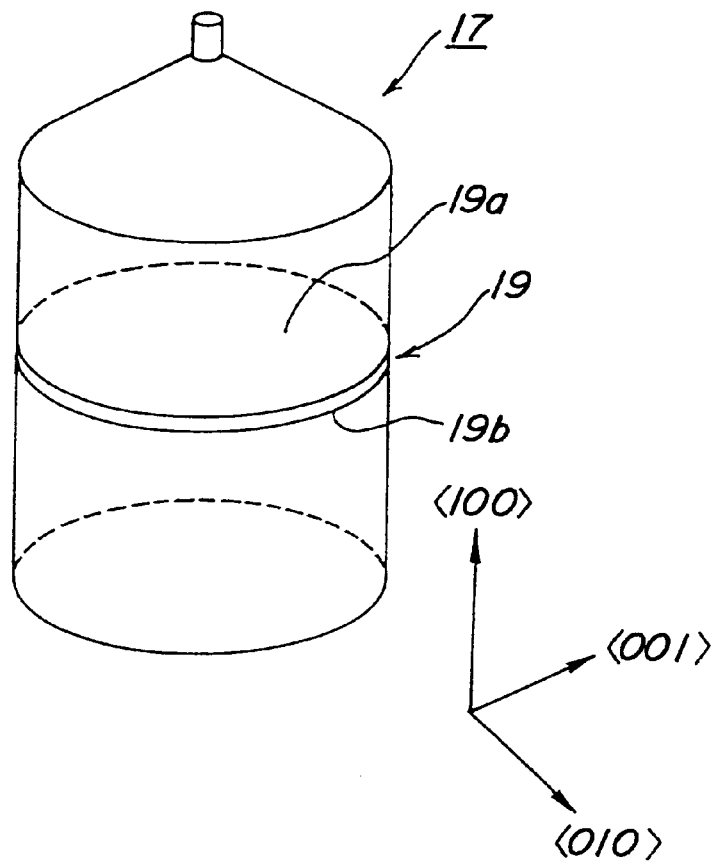
FIG_4B
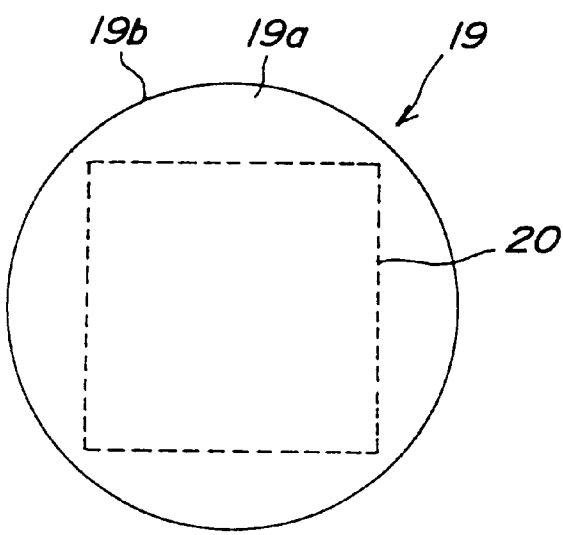

FIG_6A
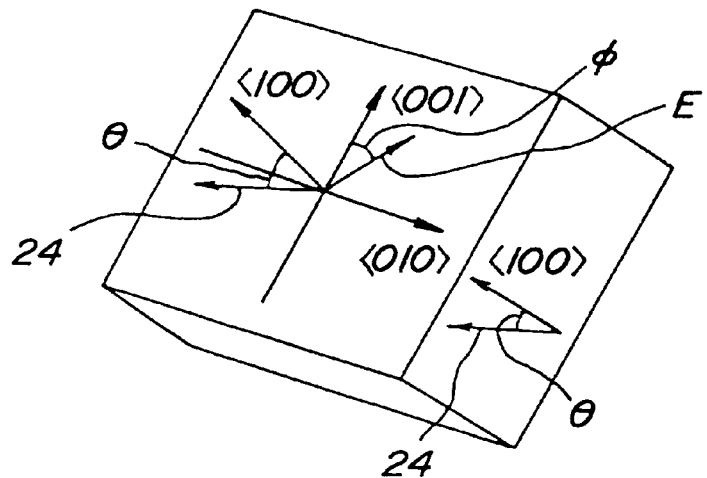
FIG_6B
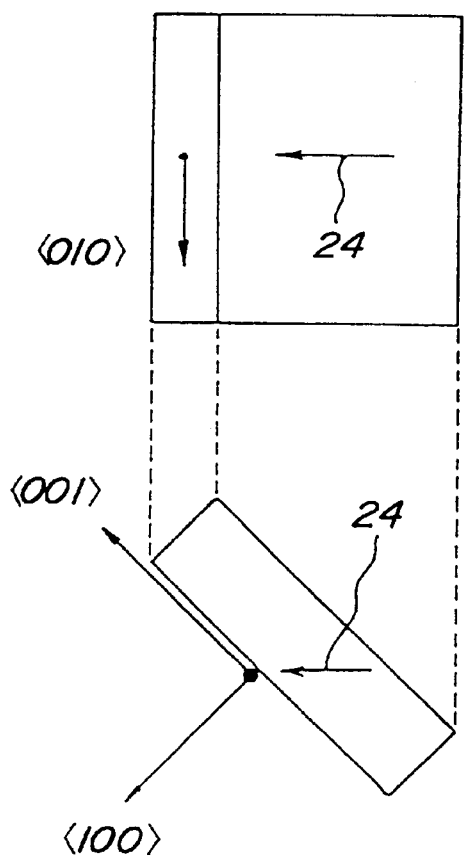

FIG_8

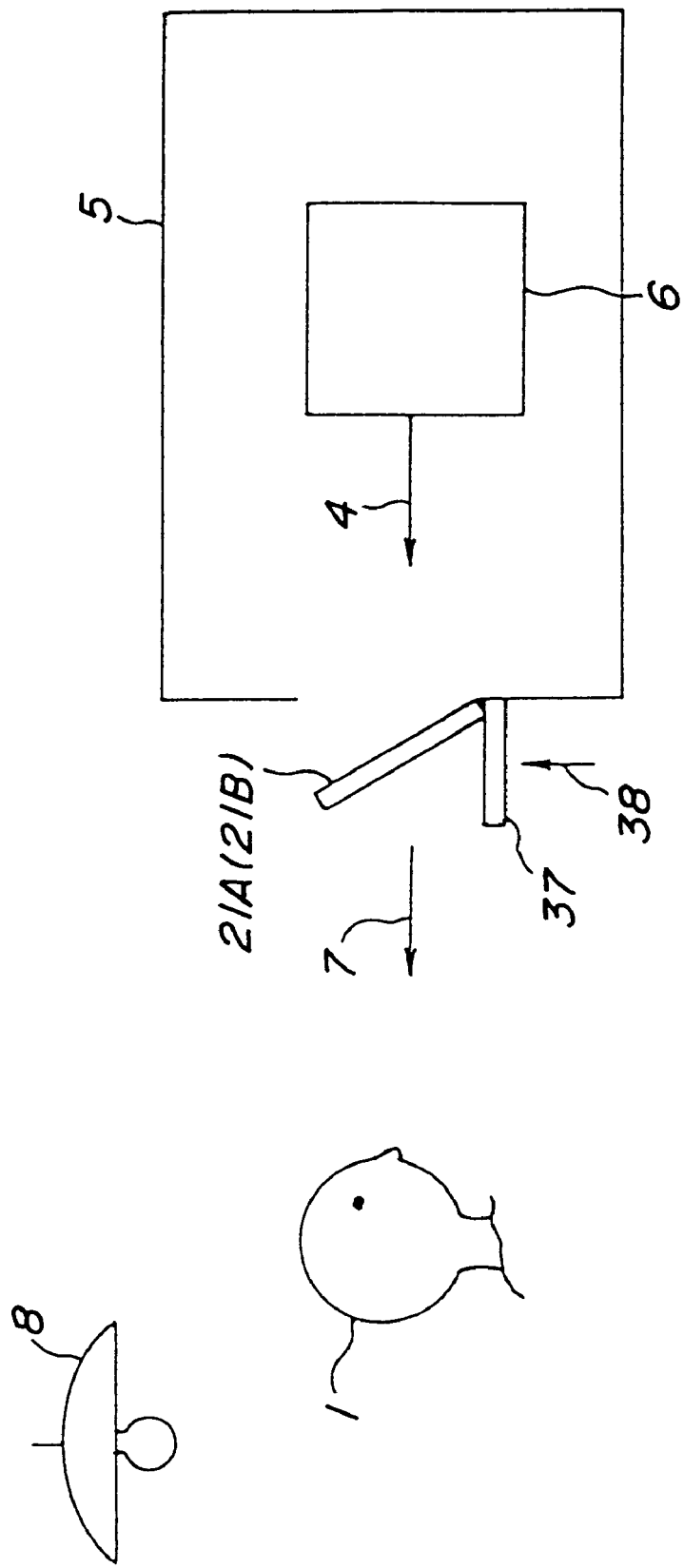

FIG_12
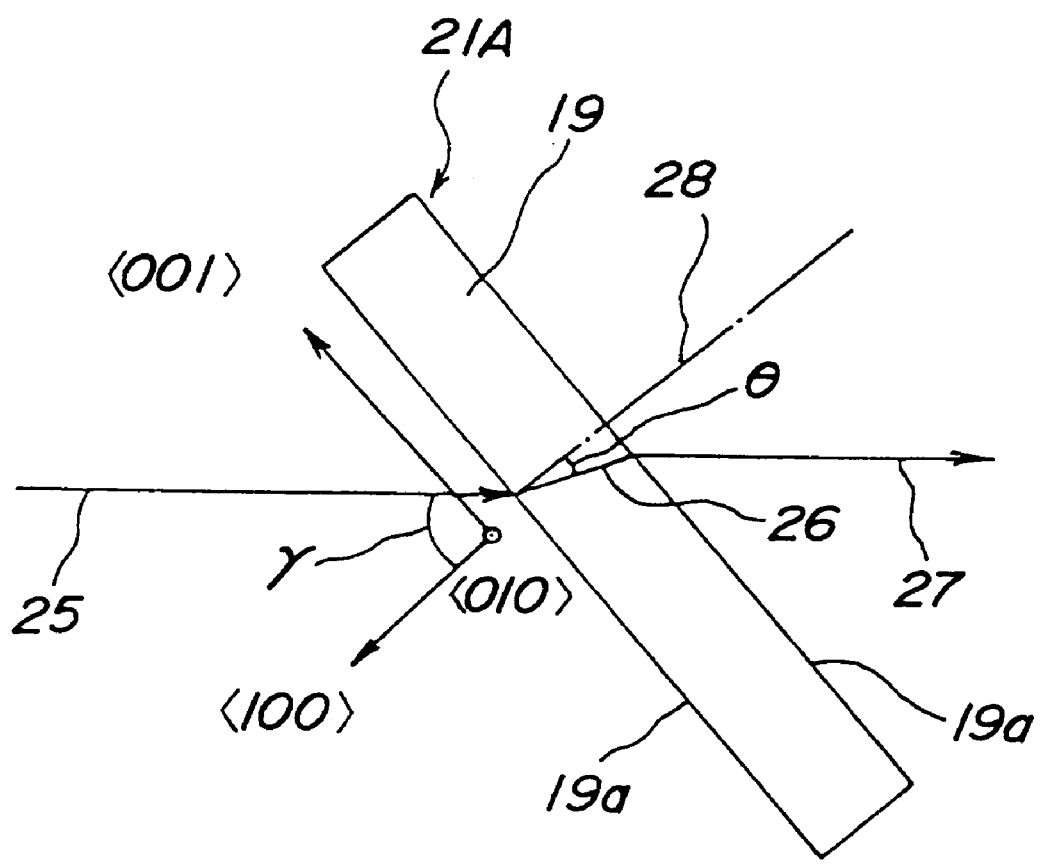

FIG_13A
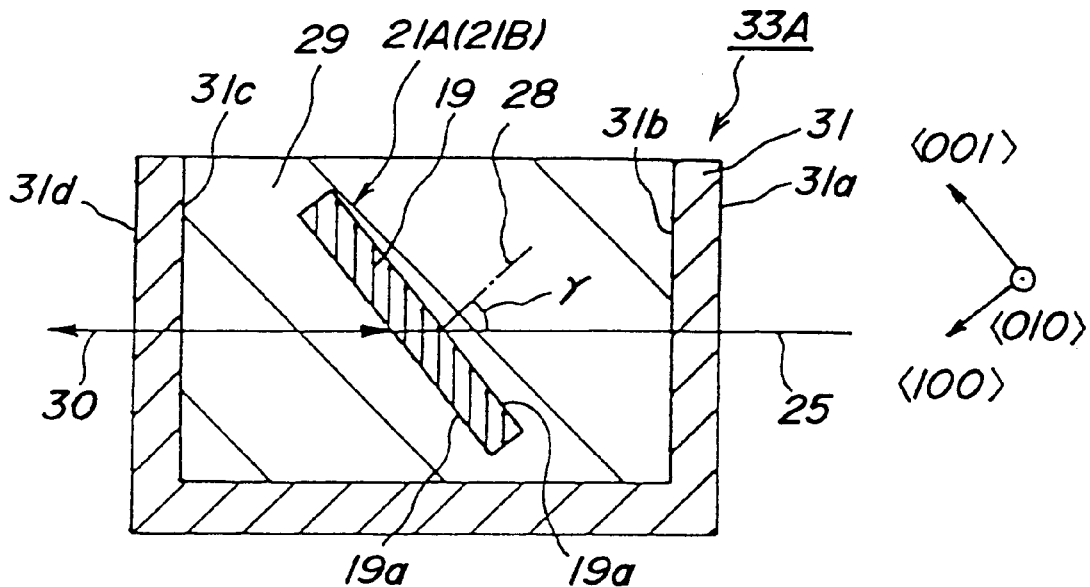
FIG_13B
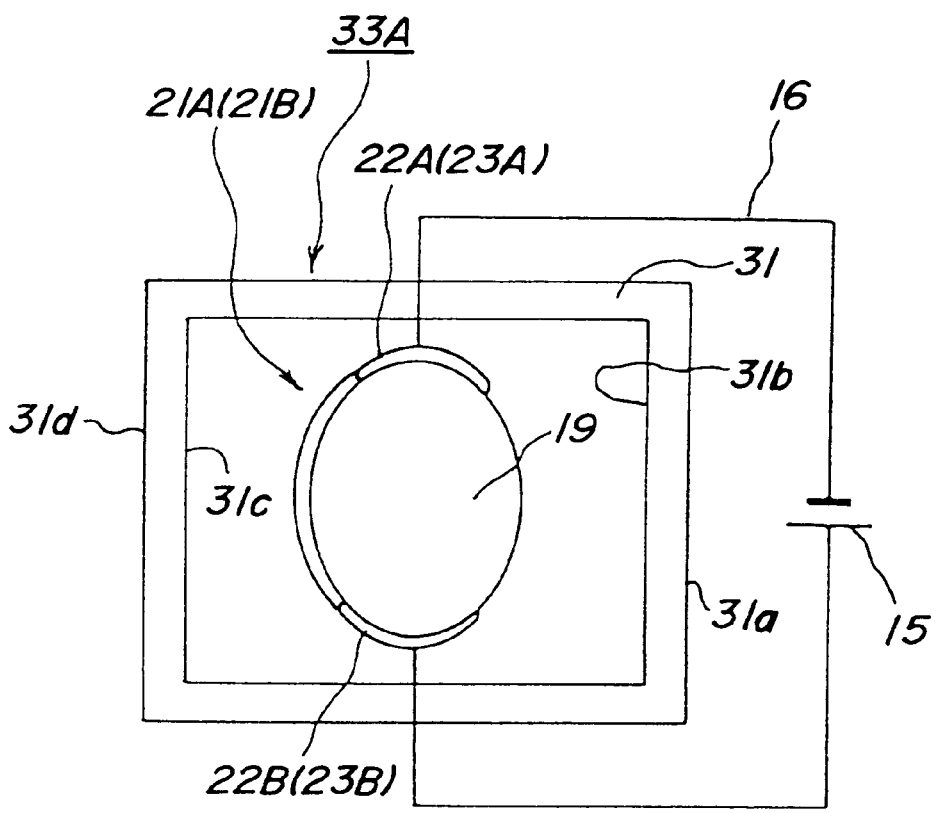

FIG_14A
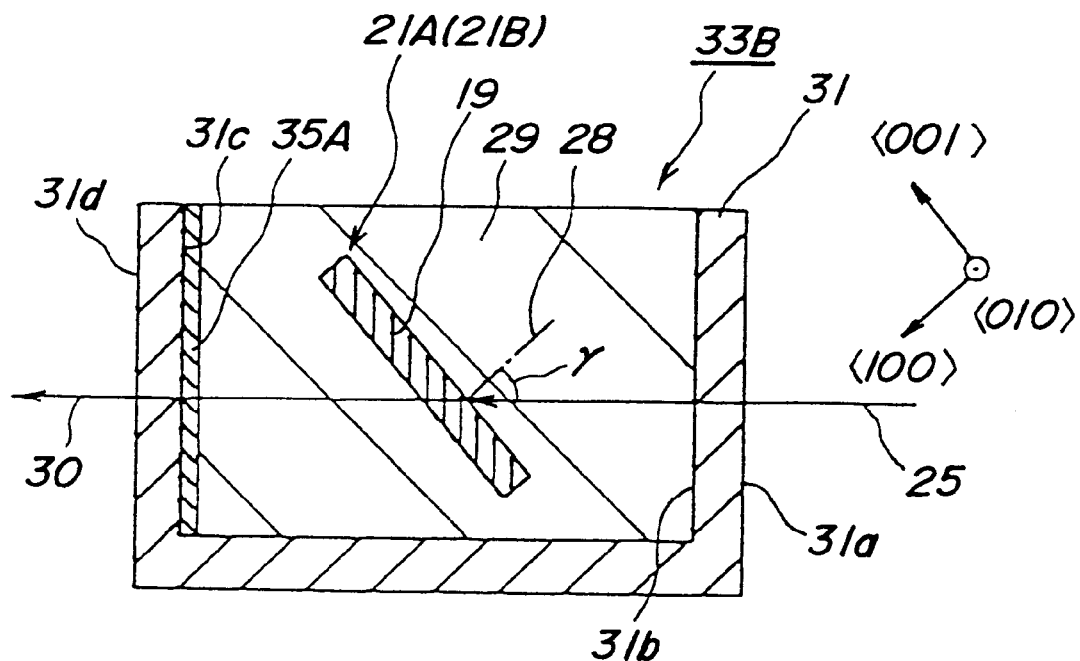
FIG_14B
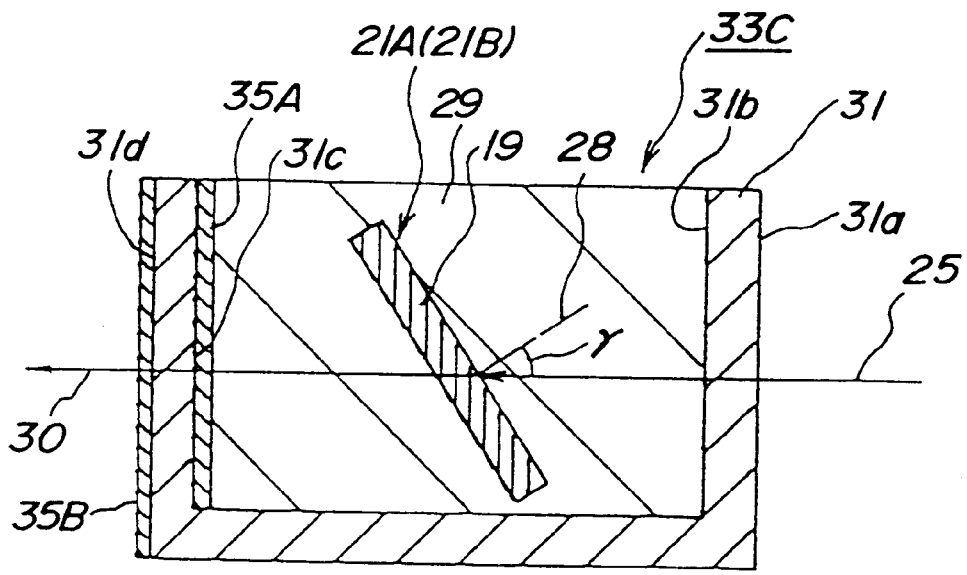

FIG_17A
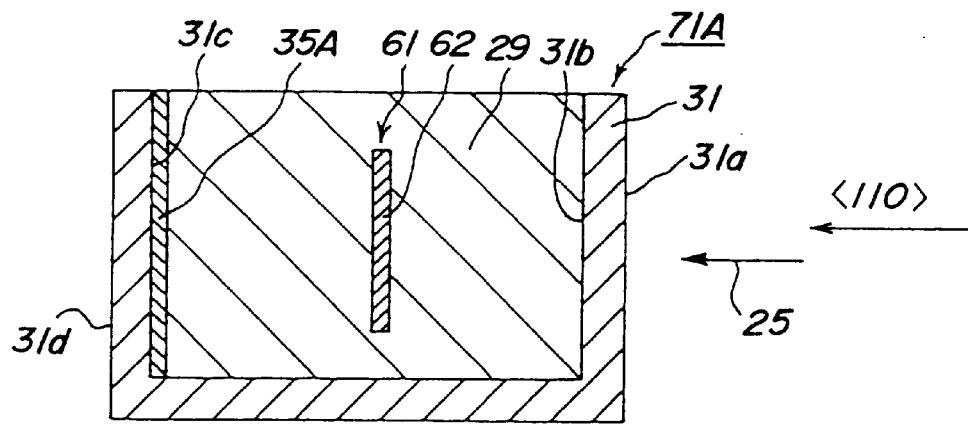
FIG_17B
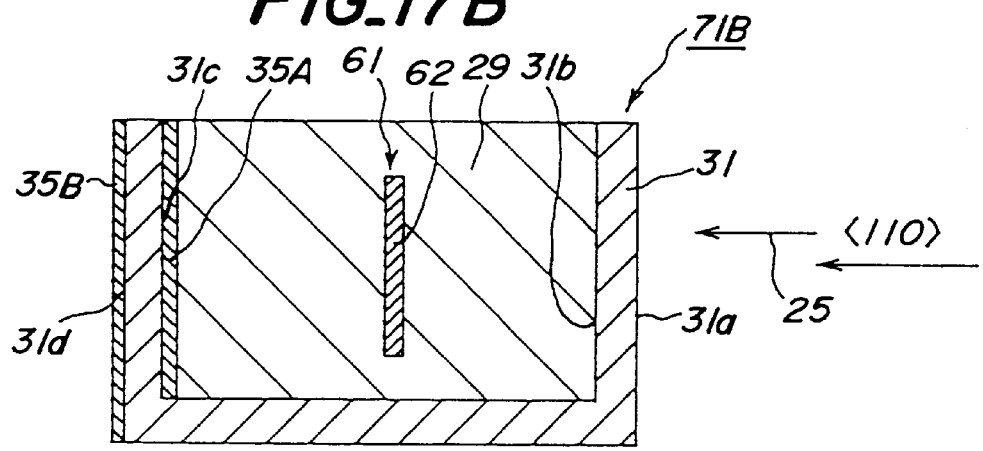
FIG_17C
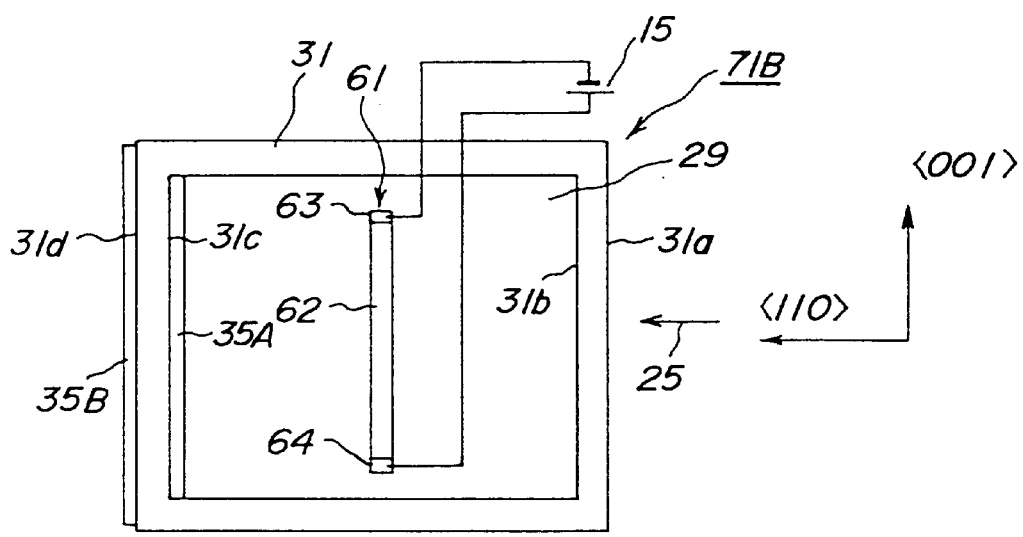

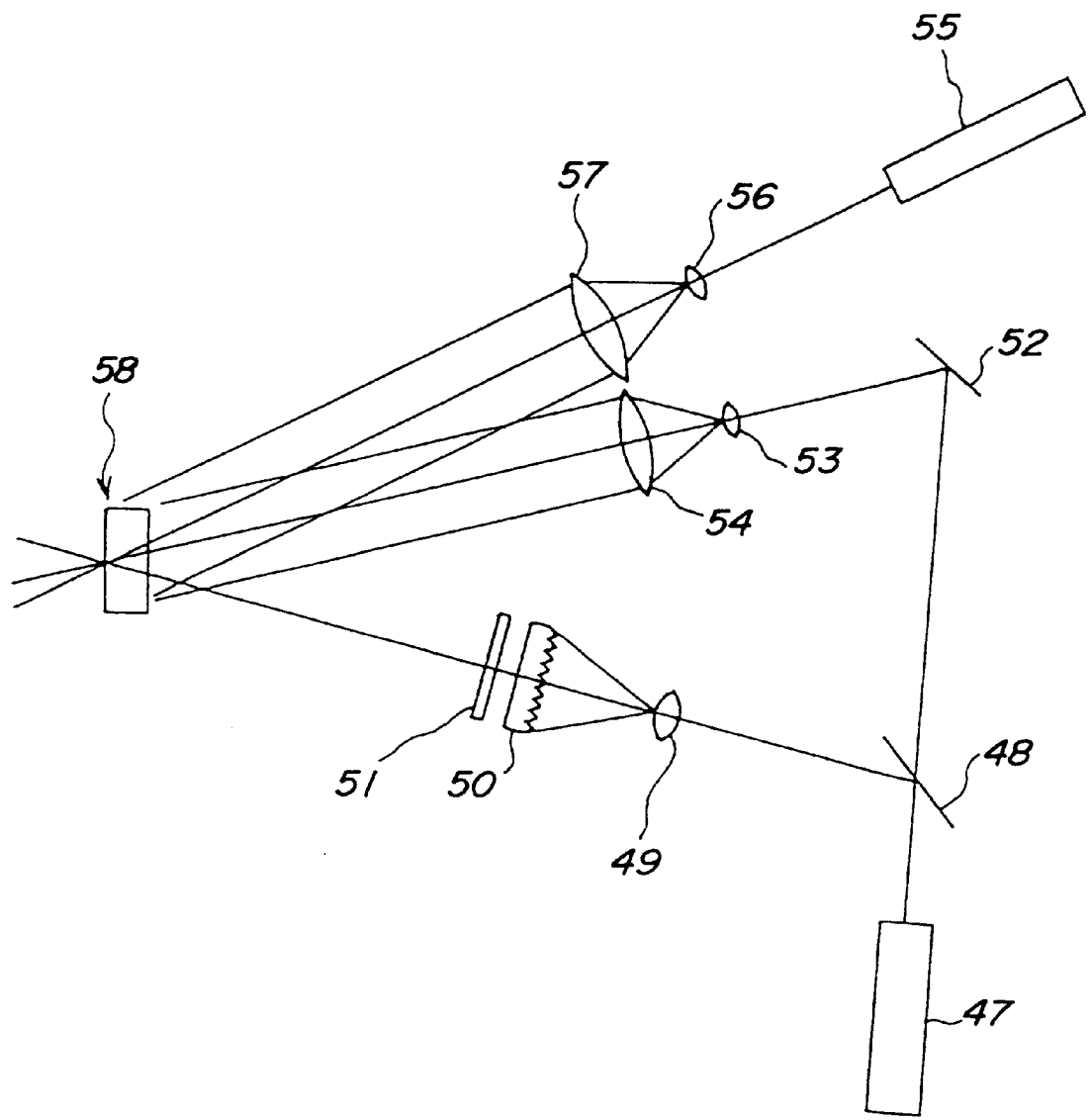
FIG_19

HOLOGRAM RECORDING AND REPRODUCING APPARATUS

BACKGROUND OF THE INVENTION

1. Field of the Invention

The present invention relates to a hologram recording and reproducing apparatus comprising a hologram record element including a record unit formed by an optical single crystal having an optically induced refractive effect and an electrode means provided on said record unit for applying a voltage to said record unit, and an optical system for impinging light onto an incident surface of said record unit.

2. Related Art Statement

A holography has been used in various applications such as interference measurement, optical information processing, optical element and three-dimensional display as a unique technique for reproducing a complete wave front. In order to perform hologram recording and hologram interference, a silver salt photosensitive material has been generally used. However, the silver salt photosensitive material requires a developing process, and thus it is impossible to realize a real time hologram. It has been proposed to use a single crystal having an optically induced refraction effect such as $Bi_{12}SiO_{20}$ as a real time hologram record element. Such a single crystal is also called a photorefractive crystal. The photorefractive crystal has been disclosed in, for instance "Laser Science Study Report", 1990 March pp. 1–9 under a title of "Holography Recording Property of BSO Single Crystal". In this reference, object light and reference light are made incident upon a major surface having a crystal orientation (110) of a $Bi_{12}SiO_{20}$ single crystal and an electric field of several kV/cm is applied in a direction perpendicular to an interference fringe by means of electrodes provided on both end faces of the (110) surface.

In applications of interference measurement, optical information processing and optical element, a size of hologram record element is limited by a purpose of respective applications, but it is not always necessary to use large hologram record elements. However, in an application of three-dimensional display, it is absolutely required to use a hologram record element having a size larger than a certain limit, because in order to attain a stereoscopic view by utilizing the parallax of a human being, a hologram record element should be not less than a pupil distance between right and left eyes. Usually, a size of the hologram record element should be larger than about 50 mm.

A size of the above mentioned real time hologram record element is physically limited by a size and shape of the $Bi_{12}SiO_{20}$ single crystal. Usually the $Bi_{12}SiO_{20}$ single crystal hologram record element has a size of ten and several mm×ten and several mm. Due to this limitation on the size, the application of the $Bi_{12}SiO_{20}$ single crystal hologram record element has been practically restricted to the interference measurement and optical information processing. The real time holography has been earnestly desired to be developed in a near future as an output device of a three-dimensional image display system in a three-dimensional CAD system. Therefore, up-sizing of the real time hologram record element has been strongly desired.

The inventor has studied and conducted various experiments for realizing a large size hologram record element which may be used in the three-dimensional display, and has been encountered the following problem.

In the three-dimensional holography, a viewer stands in front of the hologram record element such that the left and right eyes are faced with the hologram record element perpendicularly thereto and reproducing light is made incident upon the hologram record element from a side opposite to the viewer. During this reproduction, when a room in which the hologram recording and reproducing apparatus is arranged is bright, undesired light emanating from surrounding objects is made incident upon the hologram record element surface and is reflected thereby toward the viewer. Then, the reproduced three-dimensional image monitored by the user might be disturbed greatly.

Now the above problem will be explained further in detail. FIGS. 1A and 1B are schematic views for explaining the problem encountered upon viewing the three-dimensional image by using the known hologram recording and reproducing apparatus. In the known apparatus, the hologram record element is formed by (110) wafer of the photorefractive single crystal such as $Bi_{12}SiO_{20}$ single crystal. It should be noted that the $Bi_{12}SiO_{20}$ single crystal belongs to the cubic system, and therefore <100> axis, <010> axis and <001> axis are equivalent. In the known apparatus, the hologram record element is formed by cutting a (110) wafer. As illustrated in FIG. 1A, an optical system 6 is installed within a black box 5 and a hologram record element 3 is provided on one side wall of the black box. Reproducing light 4 is made incident upon an incident (110) surface of the hologram record element 3 in a direction substantially perpendicular thereto. A viewer 1 is standing at a point opposite to the optical system 6 with respect to the hologram record element 3. A viewing direction 2 of the viewer 1 is substantially perpendicular to an exit (110) surface of the hologram record element 3, which is opposed to the incident (110) surface of the hologram record element. It should be noted that the viewing direction 2 is opposite to the incident direction of the reproducing light 4 emitted by the optical system 6.

The optical system 6 is provided within the black box 5, so that any undesired light is not made incident upon the hologram record element 3 from the direction of the reproducing light 4. As shown in FIG. 1A, the exit (110) surface of the hologram record element 3 has to be exposed out of the black box 5 such that the viewer 1 can see the reproduced three-dimensional image.

The object light for recording interference fringes in the hologram record element 3 and reproducing light 4 are emitted from laser light sources. However, an amount of light emitted by the laser light source is limited. Particularly, in order not to increase a size of the whole hologram recording and reproducing apparatus, it is necessary to use as small light sources as possible. Therefore, the brightness of the reproduced image could not be made sufficiently high.

When the hologram recording and reproducing apparatus is used to display a three-dimensional image, it is required to see the three-dimensional image by the viewer 1 under a bright lighting condition including a room lighting device 8 as illustrated in FIG. 1B. However, in such case, light 9 directly emitted by the lighting device 8 and light rays reflected by surrounding substances might be made incident upon the exposed (110) surface of the hologram record element 3. Then, the incident light 9 is reflected by the hologram record element 3 and reflected light 10 is made incident upon the viewer 1. At the same time, the reproduced image light is made incident upon the viewer 1 as depicted by an arrow 7. In this manner, the undesired light 10 reflected by the hologram record element 3 is superimposed on the reproduced image light 7. As stated above, the reproducing laser light has a limited intensity and the intensity of the room lighting device 8 is relatively larger than the reproducing light, the reproduced image could not be observed under a good condition.

In order to eliminate the undesired reflection by the hologram record element 3, the inventor has designed a hologram record element shown in FIG. 2. In this hologram record element 11, a record unit 12 is formed by a rectangular flat plate made of the photorefractive crystal, a pair of electrodes 13 are provided on opposite end faces of the record unit, the electrodes being connected to a DC voltage supply source 15 by means of conductors 16. A anti-reflection film 14 is applied on a major surface 12a of the record unit 12 which is to be faced by a viewer.

The anti-reflection film 14 is formed by a dielectric film which has a specific resistance of at most about $10^9$ Ω·cm. The record unit 12 has a very high specific resistance such as on the order of $10^{14}$ Ω·cm. Therefore, the specific resistance of the anti-reflection film 14 is relatively lower than that of the record unit 12. During the recording and reproducing, it is necessary to apply a very high voltage to the hologram record element 11. When the anti-reflection film 14 having a relatively low specific resistance is applied on the surface of the record unit 12 and a high voltage is applied across the electrodes 13, there might occur undesired breakdown. Therefore, it is impossible to apply a high voltage without causing the breakdown.

Furthermore, in order to mitigate the undesired reflection by the hologram record element, the inventor has designed a hologram recording and reproducing apparatus, in which an hologram record element is inclined with respect to a reproducing light flux. As a result, it was found that a diffraction efficiency might be greatly reduced due to a refraction of an object light flux.

SUMMARY OF THE INVENTION

The present invention an object to provide a novel and useful hologram recording and reproducing apparatus, in which the above mentioned reflection by a hologram record element can be eliminated without causing the breakdown and a reproduced image can be seen under a good condition.

It is another object of the invention to provide a hologram recording and reproducing apparatus, in which not only the above mentioned reflection by a hologram record element can be eliminated without causing the breakdown so that a reproduced image can be seen under a good condition, but also the undesired decrease in the diffraction efficiency can be avoided.

According to the invention, a hologram recording and reproducing apparatus comprising a hologram record element including a record unit formed by an optical single crystal having an optically induced refractive effect and an electrode means provided on the record unit for applying a voltage to said record unit, and an optical system for impinging light onto an incident surface of the record unit, wherein the record unit is made of an optical single crystal belonging to a cubic system and the incident surface is formed by a (100) surface, and that the light is made incident upon the incident surface such that an optical axis of the incident light is inclined with respect to <100> axis of the optical single crystal by a predetermined angle θ.

According to the invention, it is preferable that the angle θ is set to a value within a range from 30° to 60°.

According to a further aspect of the invention, a hologram recording and reproducing apparatus comprising a hologram record element including a record unit formed by an optical single crystal having an optically induced refractive effect and an electrode means provided on the record unit for applying a voltage to the record unit, and an optical system for impinging light onto an incident surface of the record unit, wherein the apparatus further comprises an optically transparent and electrically insulating medium having a refractive index which differs from a refractive index of the optical single crystal by not larger than 0.50, the medium being provided at least on a side of the record medium from which the light is made incident upon the record unit, and a partition made of an optically transparent and electrically insulating material, a space between said record unit and said partition being filled with the medium.

According to the invention, by providing the hologram record element in the medium having a refractive index which is comparable to that of the record unit of the hologram record element, a change in a condition of a radiation energy at the incident surface of the single crystal forming the record unit can be minimized. That is to say, a change in an intensity and velocity of light at the incident surface can be remarkably reduced. Further, according to the invention, it is preferable to provide an anti-reflection film on the partition.

The medium should have a such an insulating property that no discharge occur under an application of the electric field of 1 kV/mm. Furthermore, the medium should be transparent within a wavelength of light used in the hologram recording and reproducing apparatus.

According to the invention, the medium provided between the record unit and the partition may be made of a refraction liquid. Then, the refraction liquid may be contained in a vessel and said partition is formed by a wall of the vessel. The refractive liquid may be selected in accordance with the refractive index of the record unit, and is preferably made of silicone oil, arsenic tripromide, disulfide/selenium compound, formulation containing selenium compound and arsenic tripromide/disulfide formulation.

These refraction liquids have refractive indices from about 1.30 to about 2.31. When the optical single crystal of the record unit is made of a birefringent material as will be explained later, the refraction liquid medium is preferably made of a material having a refractive index of about 1.9–2.31. Then, Cargille standard refraction liquids such as "Series H", "Series EH" and "Series FH" obtained from MORITECH company. "Series H" is arsenic tripromide/disulfide formation, "Series EH" is a formulation containing selenium compound, and "Series FH" is arsenic tripromide/disulfide/selenium compound.

According to the invention, the above mentioned liquid medium may be contained in a vessel and the hologram record element may be immersed in the liquid medium. Alternatively, after filling the vessel with the liquid medium, the liquid medium may be transformed into solid or gel state. Then, the vessel may be removed, and thus the apparatus according to the invention may be handled much more easily.

According to the invention, the photorefractive single crystal belonging to the cubic system may be advantageously formed by $Bi_{12}SiO_{20}$ single crystal or $Bi_{12}GeO_{20}$ single crystal. $Bi_{12}SiO_{20}$ single crystal is particularly preferable, because a process of manufacturing a large size $Bi_{12}SiO_{20}$ single crystal has been established. The electrode means may comprises a pair of electrodes made of transparent or opaque electrically conductive material. The transparent electrode may be formed by tin oxide film or tin indium oxide film. The opaque electrode may be formed by conductive adhesive containing conductive particles such as silver particles, or a metal film such as aluminum film, gold film, chromium film and titanium film.

In the hologram recording and reproducing apparatus according to the invention, the object light and reference light may be advantageously formed by an argon ion laser light having a wavelength of 488 nm at which the $Bi_{12}SiO_{20}$ single crystal shows the photoconductive effect. The reproducing light may be advantageously formed by a helium neon laser light having a wavelength of 633 nm at which the $Bi_{12}SiO_{20}$ single crystal does not show the photoconductivity.

BRIEF DESCRIPTION OF THE DRAWINGS

FIGS. 1A and 1B are schematic views showing a manner of producing undesired reflection in a known hologram recording and reproducing apparatus;

FIG. 2 is a schematic view illustrating a hologram record element developed by the inventor in the course of arriving at the present invention;

FIG. 3 is a perspective view depicting a manner of cutting (011) wafer out of a single crystal boule;

FIG. 4A is a perspective view showing a manner of cutting (100) wafer out of a single crystal boule and FIG. 4B is a plan view of the cut out (100) wafer;

FIGS. 6A and 6B are schematic views explaining a propagation of incident light within the elements shown in FIGS. 5A and 5B, respectively;

FIG. 11 is a schematic view depicting an embodiment of the apparatus according to the invention;

FIG. 12 is a front view representing a light propagating direction within the elements shown in FIGS. 5A and 5B;

FIGS. 13A and 13B are cross sectional and plan views, respectively illustrating an embodiment of the hologram recording and reproducing apparatus according to the invention comprising the hologram record element shown in FIGS. 5A and 5B;

FIGS. 14A and 14B are schematic cross sectional views depicting an embodiment of the hologram recording and reproducing apparatus according to the invention, in which the hologram record element shown in FIGS. 5A or 5B are used;

FIGS. 17A, 17B and 17C are schematic views showing embodiments of the hologram record element according to the invention comprising (110) wafer immersed in a medium;

FIG. 19 is a schematic view showing an embodiment of the optical system provided in the hologram recording and reproducing apparatus according to the invention;

FIG. 20 is a photograph of a reproduced image in the apparatus according to the invention; and FIG. 21 is a photograph of a reproduced image in the apparatus according to the invention.

DESCRIPTION OF THE PREFERRED EMBODIMENTS

Figure 5A:
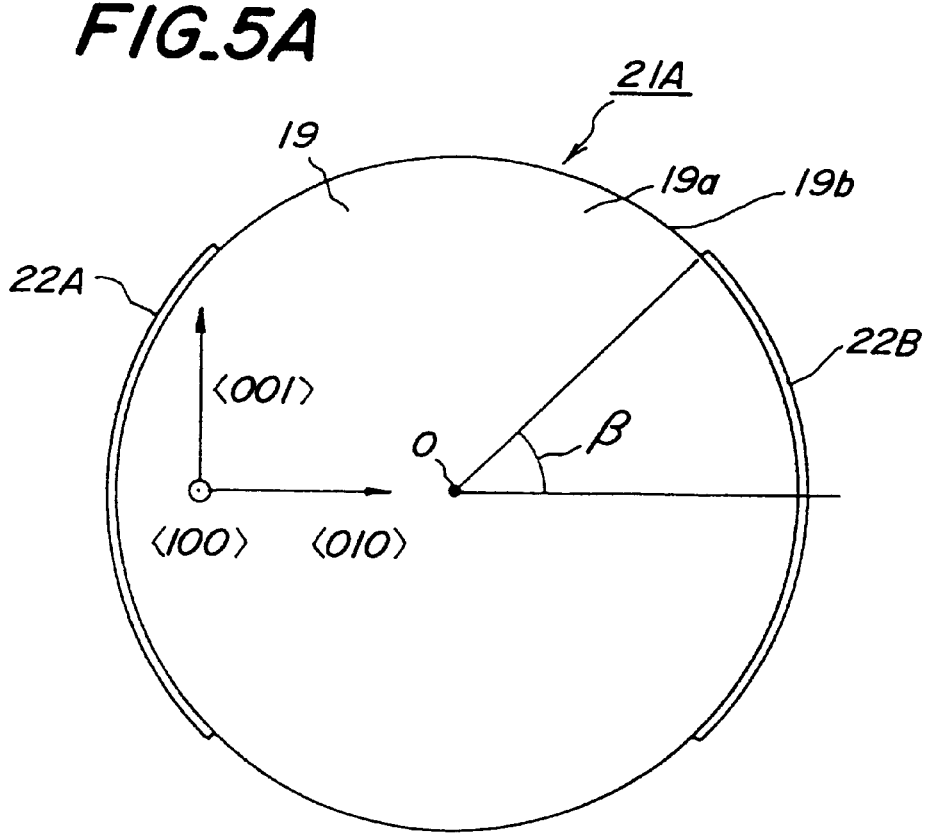
FIGS. 5A and 5B are schematic plan views illustrating various embodiments of the hologram record element according to the invention.

The inventor has conducted various experiments and analyses for solving the problem that the reproduced image is affected by the reflection of external light by the surface of the hologram record element, and has arrived at a conclusion that the above problem could be solved only by considering starting points such as the basic crystal structure and manufacturing method of the optical single crystal. It was pointed out that the optical single crystal of the hologram record element was advantageously made of $Bi_{12}SiO_{20}$ and $Bi_{12}GeO_{20}$. These single crystals were usually manufactured by the crystal pulling method (Czochralski method). In this method, there has been obtained a boule having a diameter of 80 mm and a length of about 100 mm.

As illustrated in FIG. 3, a single crystal boule 17 having a configuration of a cylinder is pulled from a melt. In this case, a pulling axis of the single crystal boule 17 is directed to be parallel with a <100> orientation. A wafer 18 is cut out of the boule 17 such that major surfaces 18a of the wafer are aligned in the <100> orientation. In the hologram record element, the light is made incident upon the major surface 18a of the wafer 18 and a voltage is applied in a direction perpendicular to an optical axis of the incident light. By adopting the cutting orientation explained above, it is possible to obtain a large size wafer having the highest diffraction efficiency. In the known hologram recording and reproducing apparatus using such a wafer, the reproducing light is made incident upon one of the major surfaces perpendicularly thereto and then emanates from the other major surface of the hologram record element toward a viewer. Therefore, light from a room lighting devices or external light is also made incident upon the major surface, and thus the reproduced image is disturbed by the reflected light.

The inventor of the instant application has reversed the common knowledge and has tired to manufacture the hologram record element by using a (100) wafer having a (100) major surface. Such a wafer has not been proposed by anyone due to the fact that the recording and reproducing could not be performed by making the light incident upon the wafer perpendicularly thereto.

As illustrated in FIG. 4A, after forming an optical single crystal boule 17, the boule is cut in a direction which is perpendicular to the crystal pulling direction (crystal orientation <100>) to obtain a wafer 19 having a substantially circular shape. The term "substantially" means that the deviation from the true circular configuration due to variations in shape during the crystal pulling, and working errors during the cutting and polishing can be accepted. Major surfaces 19a of this wafer are constructed by a (100) surface.

It should be noted that the cutting process for cutting the wafer 19 out of the boule 17 can be performed simply and easily, because the outer configuration of the original boule 17 can be utilized as it is. Further, the amount of wasted material during the cutting can be minimized. Therefore, the wafer can be advantageously manufactured on a mass production scale economically.

Figure 5B:
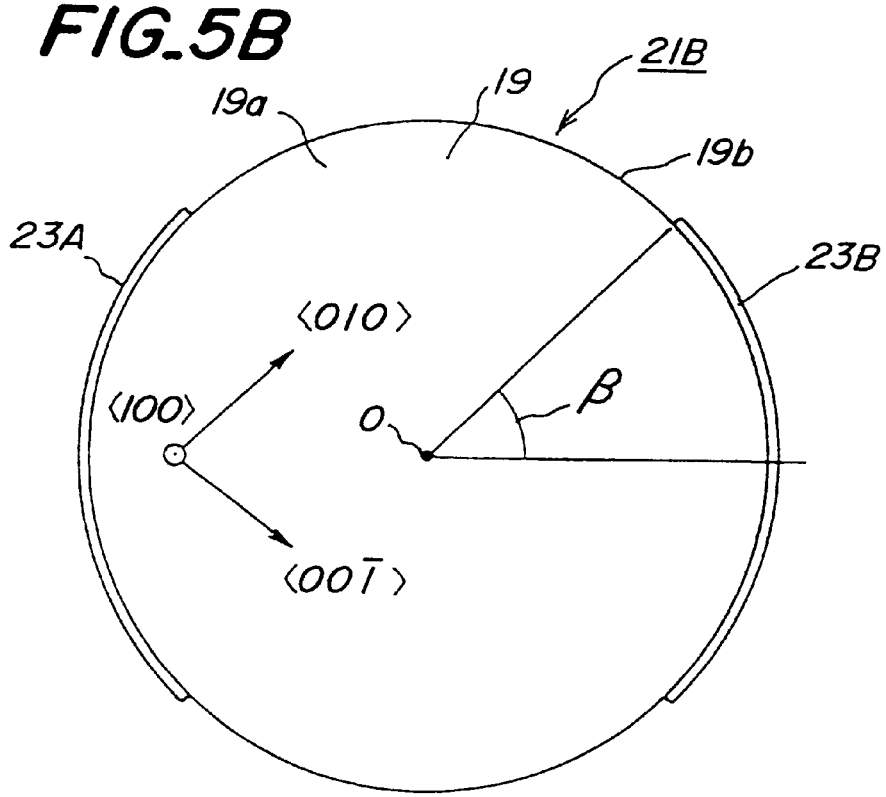

If the hologram record element is formed by a rectangular wafer 20 shown by a broken line in FIG. 4B, the circular wafer 19 has to be cut, and thus there will be produced a large amount of wasted material. According to the invention, as depicted in FIGS. 5A and 5B, the circular shape wafer 19 is used to form the hologram record element 21A or 21B. In this manner, according to the invention, a size of the record unit of the hologram record element can be large. For instance, when the wafer 19 has a diameter of 8 mm, which is larger than the pupil distance between the right and left eyes of an ordinary human being, the three-dimensional display can be realized. When the rectangular wafer 20 is used, a length of a side is about 5 mm which is smaller than the pupil distance of eyes.

FIG. 5A illustrates an embodiment of the hologram record element 21A comprising an optical single crystal wafer 19, i.e. record unit, and a pair of electrodes 22A and 22B applied on a peripheral edge 19b at diametrically opposing positions. That is to say, the electrodes 22A and 22B are symmetrically arranged with respect to a center O of the wafer 19. Each of these electrodes 22A and 22B is formed into an arch which is symmetrical with respect to the <011> orientation. An angle of the electrode viewed from the center O is denoted by 2β.

FIG. 5B depicts another embodiment of the hologram record element according to the invention. In a hologram record element 21B of this embodiment, a pair of electrodes 23A and 23B are provided on a peripheral edge 19b of a (100) wafer symmetrically with respect to a center O of the wafer. In the present embodiment, each of the electrodes 23A and 23B is formed to be symmetrical with respect to <011> orientation. An angle viewing the electrode from the center O is also denoted by 2β.

Heretofore, it has been considered that since the diffraction efficiency of the (100) wafer is 0% for the perpendicularly incident light, this wafer could never be utilized in the hologram record element. Moreover, when the circular wafer is used, the electrodes have to be provided on the peripheral edge of the wafer as shown in FIGS. 5A and 5B. Then, a person having the ordinary skill in the relevant art would consider that it is no more possible to obtain the uniform diffraction efficiency over a whole surface of the record unit, because the uniform electric field could not be applied thereto. If the diffraction efficiency differs from one another at respective regions of the record unit, it is impossible to obtain a uniformly reproduced image. Therefore, according to the prior art common knowledge, the circular (100) wafer could never be used in the hologram record element. It should be noted that if the diffraction efficiency varies over a whole surface, the wafer could not be effectively utilized in another application.

The inventor has conducted various experiments and study upon the (100) wafer and has found that such a wafer is quite useful for solving the above explained problem of the reflection of light. When the (100) wafer or a record unit cut out of the (100) wafer is used, a major surface of the record unit is (100) surface.

The inventor has conducted experiments by using the (100) wafer, in which the record unit, i.e. wafer is inclined with respect to incident light 24 as shown in FIGS. 6A and 6B, and a degree of the photorefractive effect was measured by applying an electric field E. An optical axis of the incident light 24 is inclined by an angle θ with respect to the <100> orientation, and the electric field E is inclined by an angle θ with respect to a plane defined by the <100> orientation and <001> orientation. The optical axis of the incident light 24 is perpendicular to the <010> orientation and is existent on a plane defined by the <100> orientation and <001> orientation.

Figure 7:
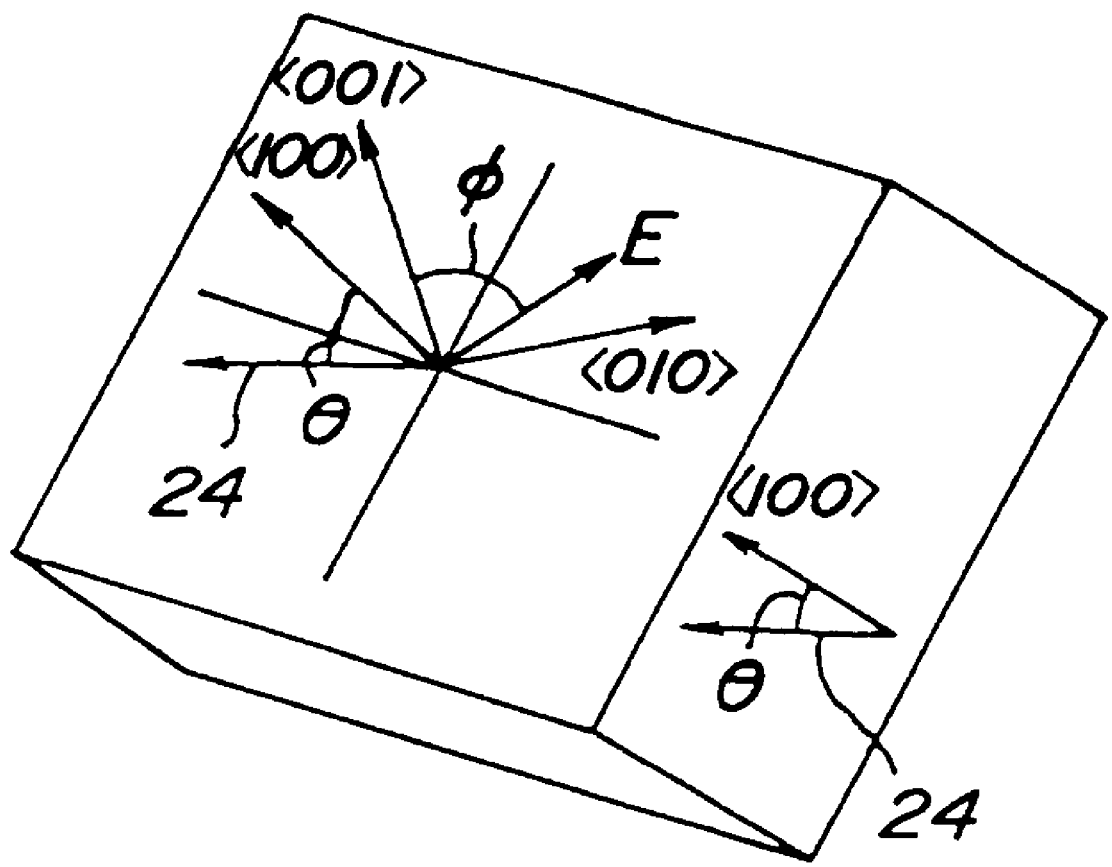
FIG. 7 is a schematic view showing an incident light direction in the elements shown in FIGS. 5A and 5B.

In an embodiment illustrated in FIG. 7, the optical axis of the incident light 24 is inclined by an angle θ with respect to the <100> orientation, and the electric field E is inclined by an angle θ with respect to a plane defined by the <100> orientation and <001> orientation. The optical axis of the incident light 24 is perpendicular to the <01-1> orientation.

Figure 8:
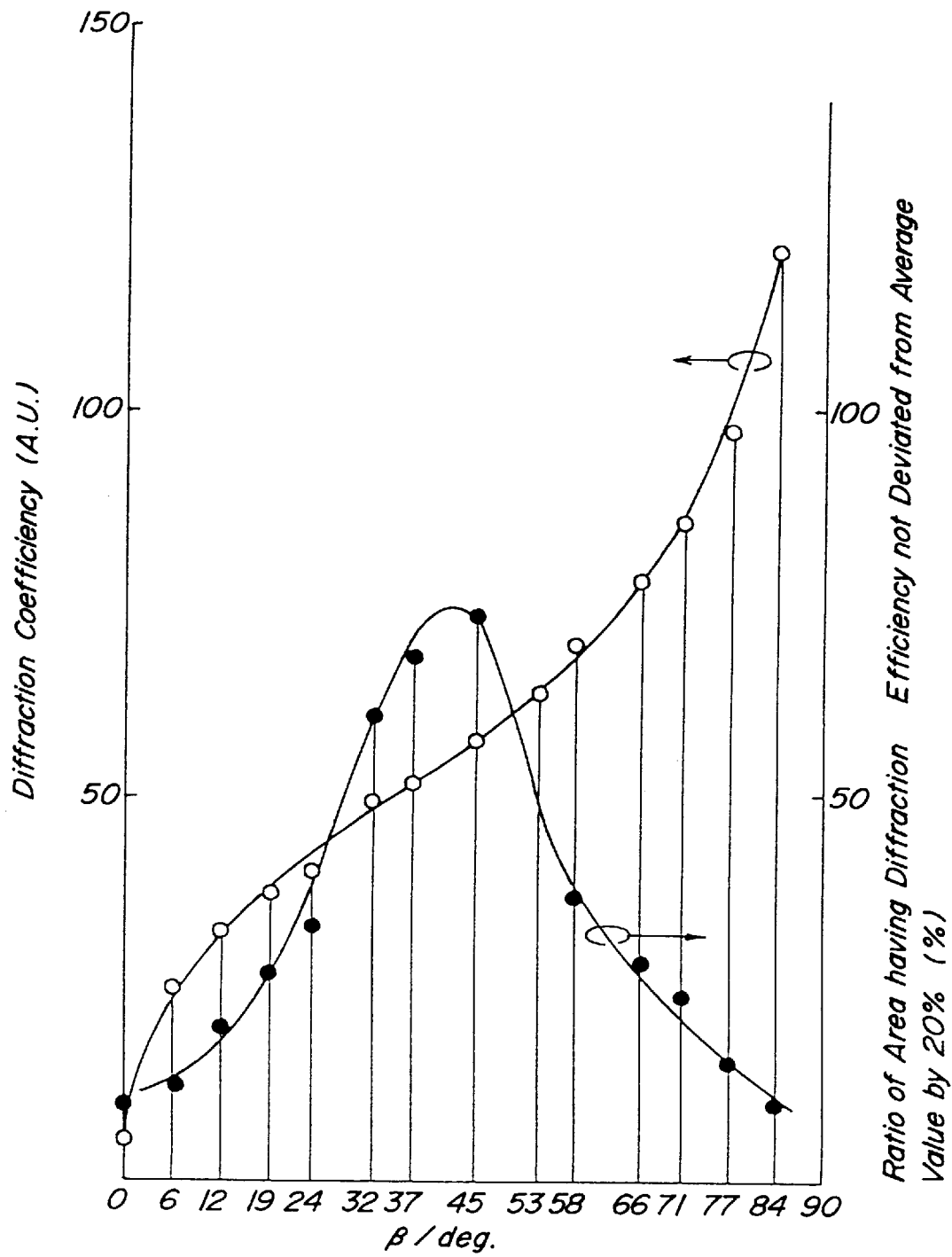
FIG. 8 is a graph representing a relation between β and diffraction efficiency in the element shown in FIG. 5A.

The hologram record element shown in FIG. 5A was used, the light was incident upon the record unit as illustrated in FIGS. 6A and 6B, and the electric voltage was applied to the electrodes 22A and 22B. Then, a variation in the refraction efficiency was measured by changing the angle β, i.e. a length of the electrodes as represented in FIG. 8. The angle θ between the optical axis of the incident light 24 and the <100> orientation was fixed to 20° (a corresponding incident angle γ is 60° so that said angle θ becomes 20° due to the refraction at the surface of the record unit). As shown in FIG. 8, the diffraction efficiency is increased within a range of β larger than 30°. FIG. 8 also shows a ratio of an area in which a deviation of the diffraction efficiency from an average value was not larger than 20% to a total area of the record unit. The ratio is remarkably increased within a range of β of 30°–60°.

Figure 9:
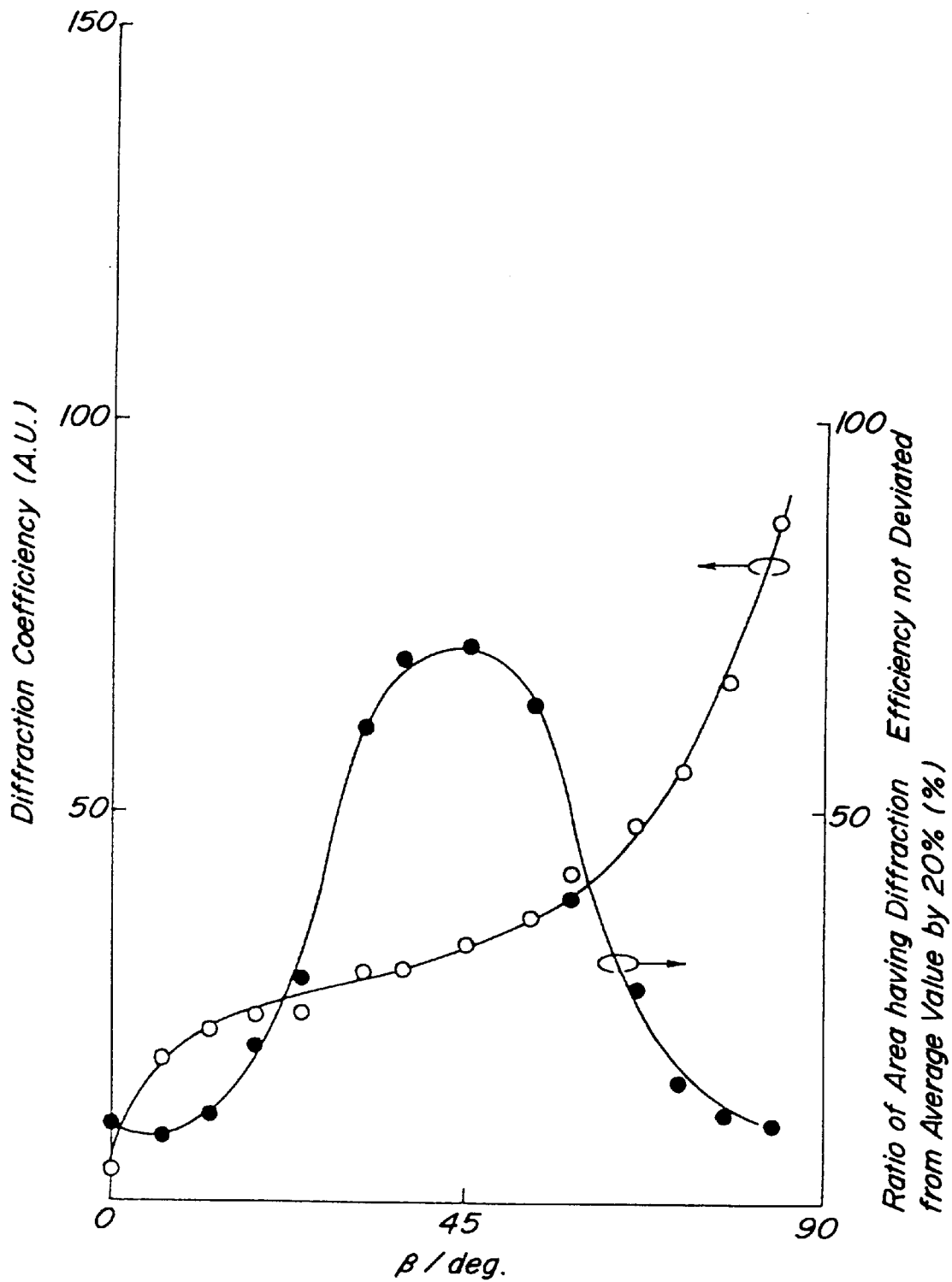
FIG. 9 is a graph expressing a relation between β and diffraction efficiency in the element illustrated in FIG. 5A.

In another experiment, the element 21A shown in FIG. 5A was used, the light was made incident as illustrated in FIG. 7 and a voltage was applied to the electrodes 22A and 22B. When the angle β was changed as depicted in FIG. 9, and the diffraction efficiency was measured. The angle θ between the optical axis of the incident light and the <100> orientation was fixed to 20°. As shown in FIG. 9, the diffraction efficiency is remarkably increased within the range of the angle β not less than 30°. A ratio of an area whose diffraction efficiency does not deviate from an average value by not less than 20% is remarkably increased within a range of the range of β of 30°=60°.

It is important that the record unit should have a small variation in the diffraction efficiency, and thus the angle β is preferably set to a value within the range of 30°–60° (2β=60°=120°). Furthermore, it has been confirmed that the highest diffraction efficiency can be attained when the optical axis of the incident light is perpendicular to the <010> orientation as shown in FIG. 6.

A similar result could be obtained when the hologram record element illustrated in FIG. 6B was used.

Figure 10:
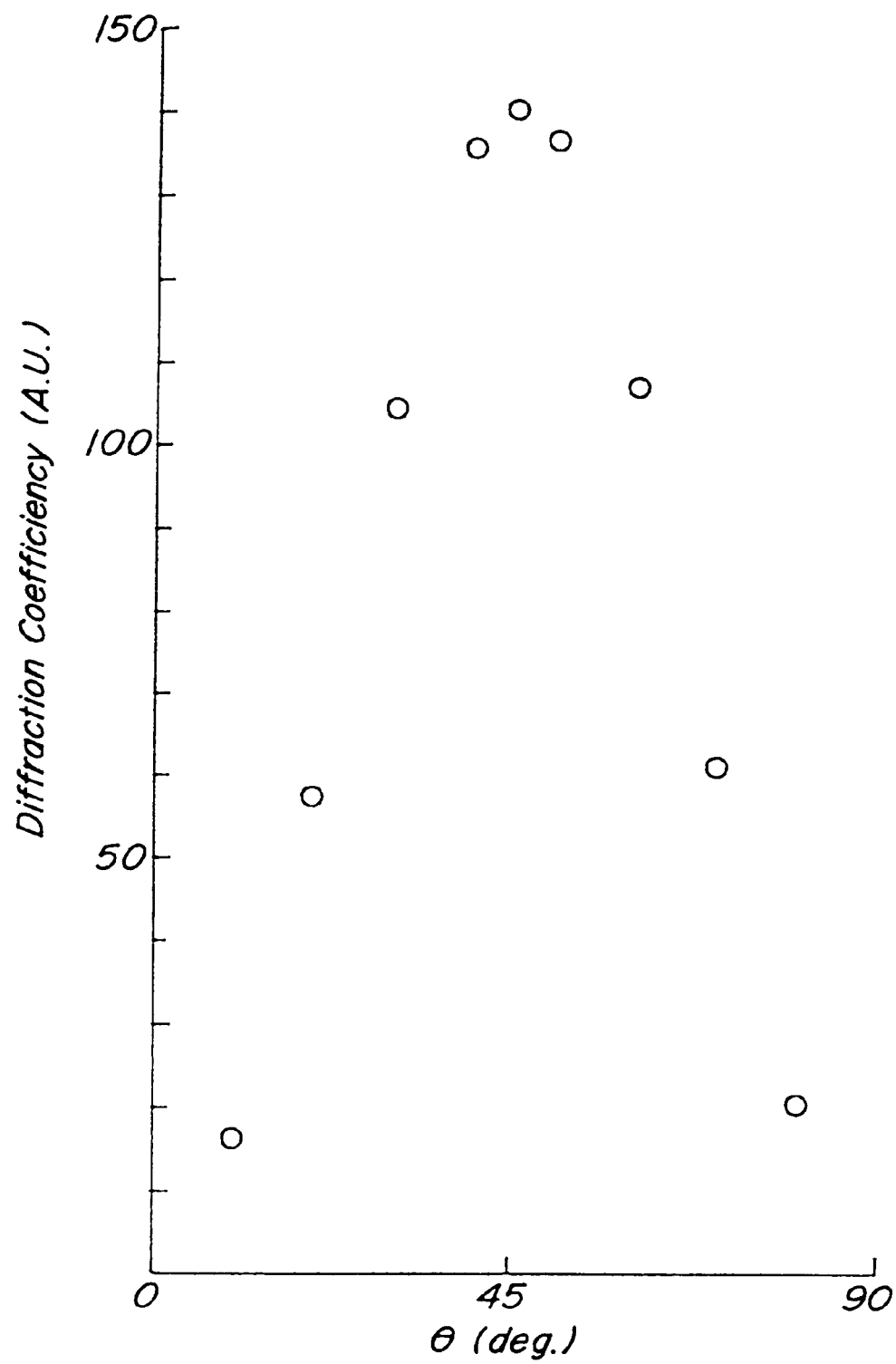
FIG. 10 is a graph showing a relationship between an angle θ of an optical axis of incident light with respect to (100) orientation of the optical single crystal and diffraction efficiency in the element shown in FIG. 5A.

Then, the hologram record element shown in FIG. 5A was used, the light was made incident upon the record unit as illustrated in FIGS. 6A and 6B, and the angle β was set to 45° at which the variation in the diffraction efficiency was minimum. Then, the angle θ between the optical axis of the incident light and <100> orientation was changed as shown in FIG. 10 and an average value of diffraction efficiency within the element was measured. The result showed that the diffraction efficiency was changed largely. The diffraction efficiency was large within a range of the angle θ of 30°–60°, and was particularly large within a range of the angle θ of 40°–50°. In order to obtain a bright reproduced image, the diffraction efficiency has to be maximum, and thus the angle θ should be set to a value within the range of 40°–50°.

As explained above, by providing a pair of electrodes as depicted in FIG. 5, the electric field E within the crystal can be uniform and the variation in the diffraction efficiency within the crystal can be greatly reduced.

Based on the above mentioned recognition, the inventor has manufactured the hologram record element by using the (100) wafer. As explained above, the element was inclined with respect to the incident light to obtain a high diffraction efficiency and to reduce the variation in the diffraction efficiency. By inclining the major surface or incident surface of the element with respect to the incident light, particularly the reproducing light, light emitted from lighting devices in a room and reflected by the element is not made incident upon a viewer, and therefore the viewer can monitor the reproduced image without being disturbed by the reflected light.

According to the invention, it is preferable to arrange the optical system within a black box and a light shielding plate is provided to be opposed to the record unit such that external light is prevented from being made incident upon the incident surface of the record unit. FIG. 11 is a schematic view showing an embodiment of such an arrangement of the optical system. In FIG. 11, an optical system 6 is arranged within a black box 5 having an opening at which a hologram record element 21A (or 21B) is provided. The element 21A is arranged such that a major surface of a record unit is inclined with respect to reproducing light 4. A light shielding plate 37 is arranged such that it is opposed to the major surface of the element 21A. Therefore, external light 38 which might be reflected by the major surface of the element 21A toward a viewer 1 if the light shielding plate is not provided, can be effectively shielded by the light shielding plate 37. It is preferable that the light shielding plate 37 has no luster.

The inventor has further found the following fact. As stated above, the hologram record element 21A or 21B has to be inclined such that the <100> orientation of the crystal, i.e. a normal 28 is inclined with respect to the optical axis of the incident light 25 as illustrated schematically in FIG. 12. The inclination angle is denoted by γ. The record unit crystal is surrounded by the air having a refractive index of 1.0, and usually the crystal has a refractive index of 2.4–2.6. In this manner, there is a very large difference in refractive index between the air and the crystal. Therefore, the incident light 25 is refracted by the incident surface 19a and then propagates within the crystal along an optical path 26. The optical path 26 is inclined by an angle θ with respect to the <100> orientation. Then, the light arrives at the major surface 19a and is refracted thereby, and then exits from the crystal as exit light 27. It should be noted that the incident light 25 is parallel to the exit light 27. The angle θ amounts only to 0°–25° due to the above mentioned large difference in the refractive index between the air and the crystal, and could not be made larger although the angle γ is changed in any way.

As explained above, since the angle θ between the optical axis 26 of the light within the crystal and the <100> orientation of the crystal is very small, the diffraction efficiency is small although the incident angle γ is set to a value near 45°. Therefore, it is very difficult to realize a useful three-dimensional display of real time hologram. Moreover, there is another problem that the Fresnel's reflection occurs at the surface of the record unit, and a loss of the reproducing light is increased.

In order to solve the above problem, according to the invention, the inventor has proposed to arrange hologram record element within a transparent medium having a refractive index which is near to that of the record unit and has an electrically insulating property. According to the invention, a difference in a refractive index between the medium and the crystal is not larger than 0.50. When the medium is liquid, the medium is contained in a vessel and the hologram record element is immersed in the liquid medium. In this case, it is preferable that the medium has a sufficient viscosity so that it is contained within the vessel without producing any bubble.

In the present invention, the medium should have such an electrically insulating property that no discharge occurs with an application of an electric field of 1 KV/mm. Further, the medium should be transparent to a whole wavelength range of light to be made incident upon the hologram record element.

Now several embodiments of the hologram recording and reproducing apparatus using the above mentioned medium will be explained.

FIGS. 13A and 13B are schematic cross sectional and plan views, respectively showing an embodiment of the hologram recording and reproducing apparatus according to the invention. The apparatus generally denoted by a reference numeral 33A comprises a rectangular vessel 31, a transparent liquid medium 29 having an electrically insulating property and contained in the vessel 31, and a hologram record element 21A (21B). The hologram record element 21A (21B) comprises a record unit 19 made of a (100) wafer and a pair of electrodes 22A (23A) and 22B (23B) provided on a peripheral edge of the record unit, the electrodes being connected to a DC voltage supply source 15 via conductors 16. Incident light 25 is made incident upon a (100) surface of a record unit 19 such that an optical axis of the incident light 25 is inclined with respect to a normal 28 of the (100) surface by an angle γ which is preferably set to 30°–60°.

When the incident light 25 is the reproducing light, the light is transmitted through wall surfaces 31a, 31b, 31c and 31d of the vessel 31, successively. Since the medium 29 has a refractive index which differs from that of the record unit 19 only slightly, a refraction angle of the incident light at the major surface of the record unit 19 is very small, and thus a difference between the incident angle γ and the inclination angle θ of the optical path within the crystal with respect to the <100> orientation becomes very small. Therefore, the diffraction efficiency of the crystal can be increased and a loss of the reproducing light due to the Fresnel's reflection at the surface of the record unit can be also prevented. According to the invention, the above mentioned function can be enhanced by setting the difference in refraction index between the medium and the record unit to be not larger than 0.5, particularly not larger than 0.1. If possible, the refractive index of the medium is identical with that of the record unit.

The vessel 31 is preferably made of an optical material such as quartz glass, which is transparent, can be easily polished and has no stria. Further, a difference in refractive index between the medium and the vessel is preferably not larger than 1.0, particularly not larger than 0.5.

FIGS. 14A and 14B are schematic cross sectional views showing embodiments of the hologram recording and reproducing apparatus according to the invention. In FIGS. 14A and 14B, portions similar to those shown in FIGS. 13A and 13B are denoted by the same reference numerals used in FIGS. 13A and 13B and are not explained in duplication. In an apparatus 33B illustrated in FIG. 14A, an anti-reflecting film 35A is applied on an inner surface 31c of a wall of a vessel 31 which is opposed to a viewer not shown. In an apparatus 33C of FIG. 14B, in addition to the anti-reflecting film 35A, a second anti-reflecting film 35B is applied on an outer surface 31d of the wall of the vessel 31. The anti-reflecting films 35A and 35B may be made of $SiO_2$, $TiO_2$ and $ZrO_2$.

In the above mentioned apparatuses, a difference in refractive index between the medium 29 and the vessel 31 is relatively large than a difference in refractive index between the vessel 31 and the air. Further, influence of the reflection of light at the inner surface 31c of the wall opposing to the viewer is greater than the influence of the reflection of external light at the outer surface 31d of the same wall of the vessel. Therefore, it is advantageous to provide the anti-reflecting film 35A on the inner wall surface 31c. It should be noted that it is furthermore preferable to provide the anti-reflecting films 35A and 35B on the inner and outer wall surfaces 31c and 31d, respectively. It is still preferable to provide anti-reflecting films also on outer and inner surfaces 31a and 31b of the opposite wall of the vessel 31.

According to the invention, the anti-reflecting film is not provided directly on the surface of the record unit 19, but is provided on the wall surface of the vessel 31. Therefore, the anti-reflecting film is isolated from the electrodes by means of the electrically insulating medium 29. This results in that the difficulty in controlling the applied voltage and undesired breakdown due to the anti-reflecting film can be avoided.

Figure 15:
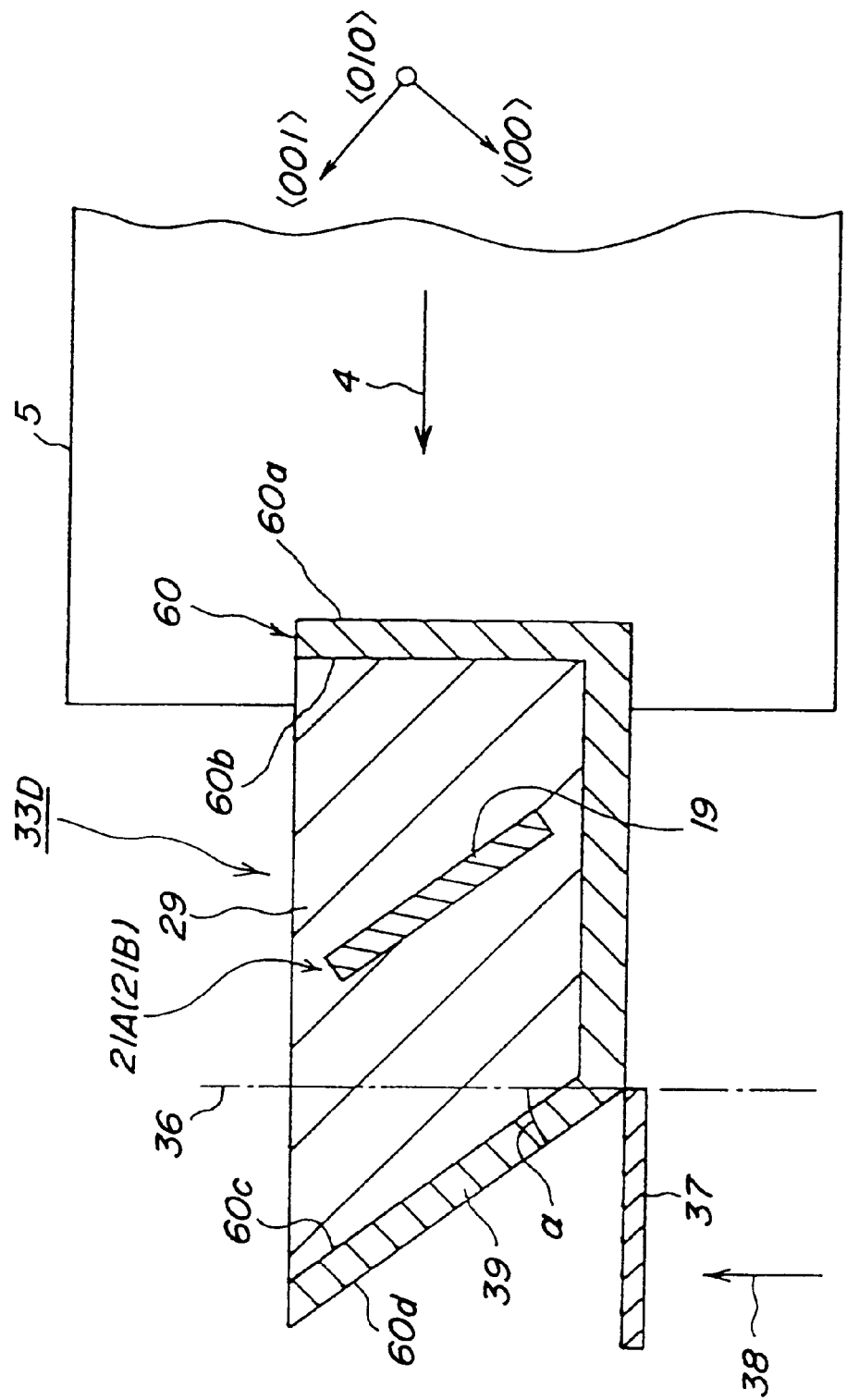
FIG. 15 is a schematic cross sectional view illustrating another embodiment of the hologram recording and reproducing apparatus according to the invention using the hologram record element illustrated in FIGS. 5A or 5B.

FIG. 15 is a schematic cross sectional view illustrating another embodiment of the hologram recording and reproducing apparatus according to the invention. An apparatus 33D comprises a black box 5, and a vessel 60 provided at an opening of the black box. The vessel 60 is filled with a medium 29, and a hologram record element 21A (21B) is embedded in the medium. Reproducing light 4 emitted by an optical system provided within the black box 5 is transmitted successively through outer and inner surfaces 60a and 60b of a wall of the vessel 10, the record unit 19 of the hologram record element, and inner and outer surfaces 60c and 60d of an opposite wall 39 of the vessel which is opposed to the viewer.

In the present embodiment, the wall 39 opposed to the viewer is inclined by an angle α with respect to a direction 36 which is normal to the reproducing light 4. A light shielding plate 37 is secured to the vessel 60 such that the plate is opposed to the wall surfaces 60c and 60d. The light shielding plate 37 extends in a direction parallel with the reproducing light 4. Then, light 38 is prevented from being made incident upon the surface 60d by the light shielding plate 37. If the light shielding plate is not provided, the light 38 might be reflected by the surface 60d toward the viewer. It should be noted that also in the present embodiment, anti-reflecting films may be provided on the wall surfaces 60a, 60c, 60c and 60d of the vessel walls.

According to the invention, the angle α is preferably set to a value within a range from 30°–60°. When the angle α is not less than 30°, the anti-reflecting function can be increased. When the angle α is set to be larger than 60°, a size of the apparatus might be increased. Therefore, it is preferable that the angle α is set to be not larger than 60°. Then, the relatively small size apparatus can be realized.

In the embodiments so far explained, the hologram record element is inclined by the angle γ with respect to the <100> orientation of the crystal of the record unit. Therefore, an effective size of the record unit of the hologram record element is reduced. According to the invention, such a problem can be also solved by providing light path control means or light deflecting means on both sides of the record unit. The light deflecting means may comprise a pair of prisms or diffraction gratings.

Figure 16A:
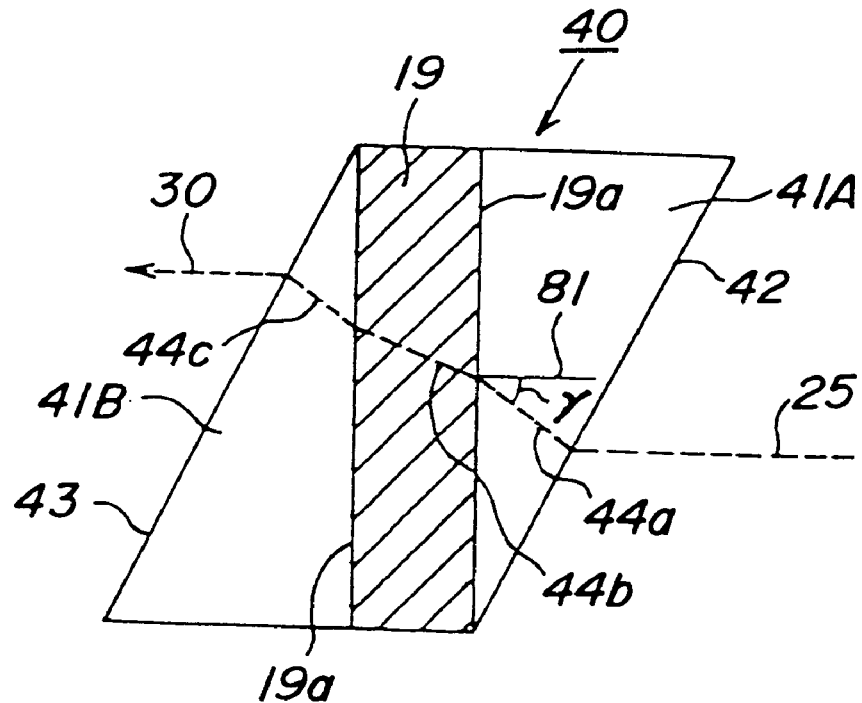
FIGS. 16A and 16B are cross sectional views depicting another embodiment of the hologram recording and reproducing apparatus according to the invention.
Figure 16B:
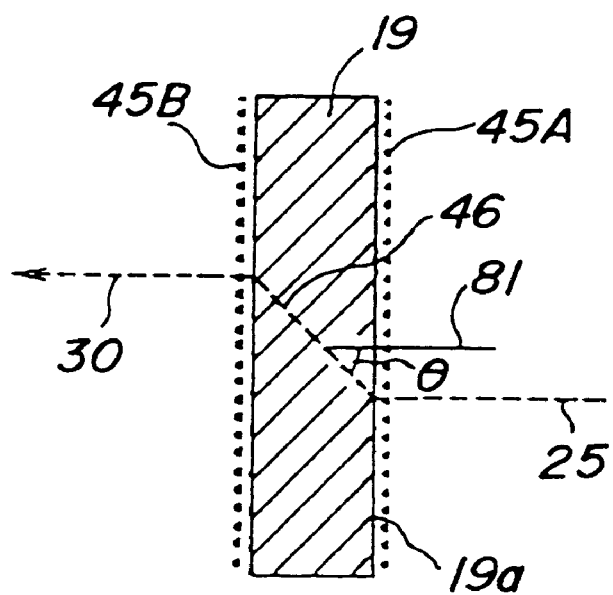

FIGS. 16A and 16B are cross sectional views showing embodiments of the hologram record element including the above mentioned light deflecting means. In a hologram record element 40 shown in FIG. 16A, first and second right angle prisms 41A and 41B are provided on opposite major surfaces 19a and 19b, respectively of the record unit 19. Incident light 25 is made incident upon a surface 42 of the first prism 41A, and then propagates along an optical path 44a within the prism 41A. Then, the light is made incident upon the surface 19a of the record unit 19 at an incident angle γ with respect to the <100> orientation 81. Within the record unit 19, the light is refracted at the surface 19a and then propagates along an optical path 44b within the record unit. At a boundary between the major surface 19a of the record unit 19 and the second prism 41B, the light is refracted and propagates along an optical path 44c within the prism. At an exit surface 43 of the prism 41B, the light is refracted again and is propagates within the air along an optical path 30.

In FIG. 16B, first and second diffraction gratings 45A and 45B are provided on opposite major surfaces 19a, respectively of the record unit 19 of the hologram record element. The incident light 25 is made incident upon the first diffraction grating 45A at right angles and is deflected by the grating along an optical path 46 which is inclined by an angle θ with respect to the <100> orientation 81. At the second diffraction grating 45B, the light is deflected into an optical path 30.

In the embodiments so far explained, the (100) wafer is used as the record unit of the hologram record element. It should be noted that the second aspect of the present invention may be equally applied to the hologram recording and reproducing apparatus using other wafer such as the (110) wafer. Now several embodiments of such an apparatus will be explained.

FIG. 17A is a cross sectional view showing a first embodiment of a hologram record element apparatus using such a (110) wafer. A hologram record element apparatus 71A comprises a hologram record element 61 including a record unit 62 consisting of a (110) wafer made of a photorefractive material such as $Bi_{12}SiO_{20}$ and $Bi_{12}GeO_{20}$. The hologram record element 61 is immersed into a transparent and electrically insulating medium 29 having a refractive index near that of the (110) wafer and contained in a vessel 31 made of a transparent material. Also in the present embodiment, an anti-reflecting film is applied on an inner wall surface 31c of the vessel 31. In the present embodiment, the (110) wafer 62 of the hologram record element 61 is arranged such that light 25 is made incident upon the wafer perpendicularly thereto.

FIG. 17B is a cross sectional view illustrating a second embodiment of the hologram record element apparatus. A hologram record element apparatus 71B comprises the hologram record element 61 including the (110) wafer 62 upon which the light 25 is made incident at right angles. In the present embodiment, first and second anti-reflecting films 35A and 35B are provided on the inner and outer wall surfaces 31c and 31d, respectively of the vessel 31.

FIG. 17C is a schematic view depicting a major portion of the hologram recording and reproducing apparatus using the hologram record element apparatus 71B shown in FIG. 17B. The hologram record element 61 is dipped in the transparent and electrically insulating medium 29 having the refractive index which is closer to that of the (110) wafer and a pair of electrodes 63 and 64 provided on the (110) wafer are connected to a DC voltage supply source 15.

Figure 18:
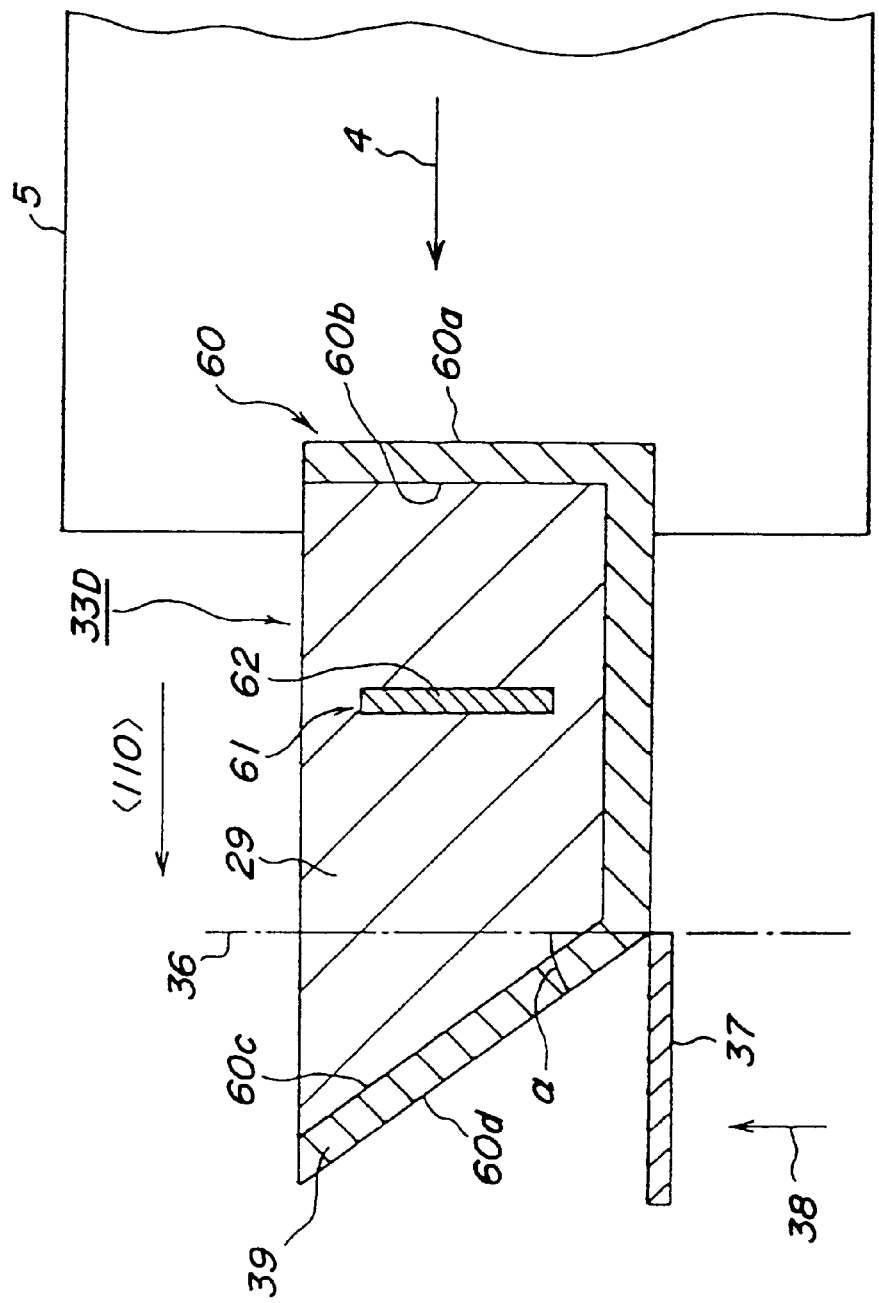
FIG. 18 is a schematic view illustrating an embodiment of the hologram recording and reproducing apparatus according to the invention using the hologram record element shown in FIG. 17A.

FIG. 18 is a schematic cross sectional view showing an embodiment of the hologram recording and reproducing apparatus according to the invention using the hologram record element 61 including the record unit made of the (110) wafer 62 and immersed in the transparent and electrically insulating medium 29 contained in the vessel 31. The hologram record element 61 is arranged in the vessel 31 such that the light 25 is made incident upon the (110) wafer 62 at right angles. The vessel 31 has the same construction as that of the vessel shown in FIG. 15, and the light shielding plate 37 is secured to the vessel.

Now several experiments will be explained.

[Experiment 1]

At first, the hologram record element shown in FIG. 5A was manufactured in the following manner. A $Bi_{12}SiO_{20}$ single crystal boule having a diameter of 80 mm and a length of 100 mm was manufactured by using a cylindrical crucible made of platinum and having a diameter of 150 mm and a height of 150 mm. Within the crucible, a sintered body of $Bi_{12}SiO_{20}$ of 14 Kg was placed and was heated at 900° C. to form a melt. By using a platinum after heater, a temperature gradient from an upper opening of the crucible to a position which is higher than said opening by 10 mm was set to 50–75° C./cm, and a temperature gradient within a range from 10 mm high to 150 mm high from the opening of the crucible was adjusted to 10° C./cm. A crystal pulling speed was set to 1–1.5 mm/hour and a revolving rate of a crystal pulling axis was set to 10 rpm. Then, the $Bi_{12}SiO_{20}$ single crystal boule having the following characteristics was obtained.

TABLE 1 latice constant: $10.103 \times 10^{-10}$ m
density: $9.2$ g/cm$^3$
dielectric constant: 56 (100) kHz)
refractive index: 2.53 ($\lambda$ = 633 nm)
dark resistance: $10^{14}$ $\Omega \cdot$ cm
photoconductivity: $10^8$ $\Omega \cdot$ cm ($\lambda$ = 458 nm, 2.5 mW/cm$^2$)
half rectified voltage: 3900 V ($\lambda$ = 633 nm)
Verdet constant: $3.67 \times 10^{-3}$/Oe $\cdot$ cm ($\lambda$ = 633 nm)
$9.33 \times 10^{-4}$/Oe $\cdot$ cm ($\lambda$ = 1150 nm)

Next, the record unit 19 was cut out of the boule as shown in FIGS. 4A and 4B. The record unit 19 was a circular disk having a diameter of 80 mm and a thickness of 2 mm. Major surfaces of the record unit 19 were polished to such an extent that a flatness of 0.6 μm was attained. An peripheral portion of the record unit was not polished and had depressions and protrusions of about 3 mm. Then, a pair of electrodes 22A and 22B were formed as illustrated in FIG. 5A by painting an electrically conductive epoxy resin containing a silver powder to a thickness of 0.2 mm. Several samples were manufactured by changing the angle β of the electrode. The light was made incident upon the record unit as depicted in FIG. 6.

A DC voltage of 40 kV was applied across the electrodes. Two argon ion laser beams crossing with each other by an angle of 3° was made incident upon the record unit as the object light at the incident angle of 60°. A diameter of the laser beam was 100 mm. On the record unit, interference fringes having a repetition rate of 130 lines/mm were recorded.

Then, the reproducing light consisting of a helium-neon laser beam having a wavelength of 633 mm and a diameter of 1 mm was made incident upon the record medium at such an incident angle that the Bragg's condition was satisfied to obtain a first order diffracted light. Since the $Bi_{12}SiO_{20}$ single crystal hologram belongs to the thick volume hologram, an angle selectivity of the reproducing light is very sever. Therefore, if the reproducing light is not made incident upon the record unit at such an incident angle that the Bragg's condition is not satisfied, no diffraction occurs.

Then, the diffraction efficiency of these samples were measured to obtain a result shown in Table II.

Table II

TABLE 2

| Sample No. | β | Average diffraction efficiency (%) | Ratio of area within ± 20% of average diffraction efficiency (%) |
|---|---|---|---|
| 1 | 15° | 0.12 | 22 |
| 2 | 25° | 0.14 | 33 |
| 3 | 30° | 0.17 | 58 |
| 4 | 35° | 0.18 | 72 |
| 5 | 45° | 0.20 | 75 |
| 6 | 50° | 0.21 | 61 |
| 7 | 55° | 0.23 | 40 |
| 8 | 65° | 0.25 | 22 |

From the table II, it has been confirmed that a relatively high diffraction efficiency can be attained, the variation in the diffraction efficiency can be suppressed and a bright reproduced image can be obtained by setting the angle β to 30°–50°. In this manner, it has been proved that the hologram record element according to the invention can be advantageously utilized in a practical display device. Particularly, the variation in the diffraction efficiency can be remarkably reduced by setting the angle β to 35°–45°.

It should be noted that the curves shown in FIG. 8 were obtained by conducting similar experiments, in which the angle β was set to different values, i.e. 6°, 12°, 19°, 24°, 32°, 37°, 45°, 53°, 58°, 66°, 71°, 77° and 84°.

[Experiment 2]

By using the hologram record element having the angle β of 45°, the hologram recording and reproducing apparatus shown in FIG. 11 was manufactured. The optical system shown in FIG. 19 was provided in the apparatus. In FIG. 19, a hologram device including the hologram record element shown in FIG. 11 is denoted by a reference numeral 58. An argon ion laser beam having a wavelength of 488 nm and emitted from an argon ion laser 47 is divided into two laser beams by means of a half mirror 48. One of the divided laser beams reflected by the half mirror 48 is made incident upon a lens 49, diffusion plate 50 and a transparent film 51 on which an original image is printed. The transparent film 51 has a size of 60 mm×60 mm. Light emanating from the film 51 is made incident upon the hologram device 58 as the object light.

The laser beam transmitted through the half mirror 48 is reflected by a mirror 52 and is transmitted through a condenser lens 53 and collimator lens 54. A parallel laser beam emanating from the collimator lens 54 is made incident upon the hologram device 58 as the reference light. The object light and reference light are crossed with each other at a crossing angle of 3°. In this manner, the original image on the film 51 is recorded on the hologram record element device 58.

The laser beam had an energy of 4 mJ/cm$^2$, the applied DC voltage was 40 kV, and the distance between adjacent interference fringes was 130 lines/mm.

Then, a helium neon laser beam having a wavelength of 633 nm and a uniform light intensity distribution over a diameter of 100 mm was emitted from a helium neon laser light source 55 and was made incident upon the record unit by means of the condenser lens 56 and collimator lens 57. The laser beam was made incident upon the record unit at an incident angle which satisfies the Bragg's diffracting condition.

The thus reproduced image was monitored in a room having a brightness of 100 lux. Then, the reproduced image was seen at the original image position. Therefore, it has been experimentally confirmed that the depth of the original image can be reproduced also in the reproduced image. FIGS. 20 and 21 are photographs showing the reproduced image. The depth of the holography can be recognized by utilizing the parallax of the right and left eyes. In this manner, according to the invention, the three dimensional display of real time hologram can be realized and the depth of the original image can be faithfully reproduced by means of the parallax. Moreover, the disturbance of the reproduced image due to the undesired reflection can be effectively avoided.

It should be noted that the image once recorded on the record unit of the hologram record element can be erased by reducing the voltage to 0V and blue light is uniformly made incident upon the record unit.

[Experiment 3]

The $Bi_{12}SiO_{20}$ single crystal boule having a diameter of 80 mm and a length of 100 mm used in the Experiment I was manufactured. Then, the (110) wafers were cut out of the single crystal boule as shown in FIG. 3. Each of the (110) wafers had a size of 50 mm×50 mm×3 mm. The major surfaces of the wafer were polished to obtain the flatness of 0.6 μm. Next, a pair of transparent electrodes made of indium oxide tin and having a thickness of 1000 Å were formed on the wafer by the vacuum evaporation.

A vessel made of a synthetic quartz was filled with a refraction liquid medium made of arsenic tribromide/disulfide/selenium compound, and the hologram record element was immersed in the refraction liquid as shown in FIGS. 17A and 17B.

A DC voltage of 20 kV was applied across the electrodes and two argon ion laser beams having a wavelength of 488 nm were made incident upon the hologram record element as the object light. These laser beams were crossed with each other at an angle of 3°. A diameter of the laser beams was 100 mm. Then, interference fringes were formed on the hologram record element at 100 lines/mm. The laser beam had an energy of 4 mJ/cm².

Then, a helium neon laser beam having a wavelength of 633 nm was made incident upon the hologram record element at an incident angle satisfying the Bragg's diffracting condition to obtain a first order diffracted light. The diffraction efficiency given by a ratio of an intensity of the first order diffracted light to an intensity of the incident reproducing light was 0.7%.

The hologram recording and reproducing apparatuses were constructed by using the above mentioned hologram record element apparatuses shown in FIGS. 17A and 17B and the optical system shown in FIG. 19, and the hologram recording and reproducing process was conducted under similar conditions to those of the Experiment 2. Also in the present Experiment 3, the reproduced image was monitored with the depth of the original image without being disturbed by the reflected light.

[Experiment 4]

The hologram recording and reproducing apparatus shown in FIG. 18 was constructed by using the hologram record element, vessel and medium used in the Experiment 3. The light shielding plate was formed by a non-woven cloth. The angle α was set to 45°. Then, the diffraction efficiency was measured under the same condition as that of the Experiment 3. The diffraction efficiency was 0.7%. Also in the present Experiment 4, the hologram image could be recorded and reproduced in a similar manner to that of the Experiment 3.

As explained above in detail, according to the invention, the clear reproduced image can be seen without being disturbed by the light reflected by the record unit surface of the hologram record element. Further, by using the (100) wafer of the photorefractive single crystal as the record unit of the hologram record element and by immersing the hologram record element in the transparent and electrically insulating medium having a refractive index comparable to that of the (100) wafer, it is possible to attain the maximum diffraction efficiency, and therefore the bright reproduced image can be seen without being disturbed by the reflected light. In this manner, according to the invention, the tree-dimensional display of the real time hologram can be realized.

What is claimed is:

1. A hologram recording and reproducing apparatus comprising a hologram record element including a record unit formed by an optical single crystal having an optically induced refractive effect and an electrode means provided on the record unit for applying a voltage to said record unit, and an optical system for impinging light onto an incident surface of said record unit, wherein said record unit is made of an optical single crystal belonging to a cubic system and said incident surface is formed by a (100) surface, and said light is made incident upon the incident surface such that an optical axis of the incident light is inclined with respect to <100> axis of the optical single crystal by a predetermined angle θ.

2. An apparatus according to claim 1, wherein said optical system is provided within a black box having an opening and said hologram record element is arranged at said opening of the black box, and a light shielding plate is provided to be opposed to the record unit of the hologram record element such that external light is prevented from being made incident upon the record unit.

3. An apparatus according to claim 1, wherein said record unit is formed by a substantially circular single crystal wafer obtained by cutting a boule which is formed by a crystal pulling of an optical single crystal in a direction of <100> orientation.

4. An apparatus according to claim 3, wherein said electrode means comprises a pair of electrodes provided on a peripheral edge of said substantially circular single crystal wafer at mutually opposing positions such that the electrodes are symmetrical with respect to a center of the wafer, and each of said electrodes is formed in the shape of an arc having a center angle of 60°–120°.

5. An apparatus according to claim 1, wherein said angle θ is set to a value within a range from 30° to 60°.

6. An apparatus according to claim 1, wherein the apparatus further comprises an optically transparent and electrically insulating medium having a refractive index which differs from a refractive index of said optical single crystal by not larger than 0.50, said medium being provided at least on a side of the record medium from which the light is made incident upon the record unit.

7. An apparatus according to claim 6, wherein the apparatus further comprises a partition made of an optically transparent and electrically insulating material, a space between said record unit and said partition being filled with said medium.

8. An apparatus according to claim 7, wherein at least one anti-reflection film is applied on said partition.

9. An apparatus according to claim 7, wherein said medium is made of a refraction liquid contained in a vessel which is made of an optically transparent and electrically insulating material and constitutes said partition, said hologram record element is immersed in the refraction liquid.

10. An apparatus according to claim 9, wherein at least one anti-reflection film is provided on a wall surface of said vessel.

11. An apparatus according to claim 1, wherein said optical single crystal of the record unit is made of a photorefractive crystal selected from the group consisting of $Bi_{12}SiO_{20}$ and $Bi_{12}GeO_{20}$.

12. An apparatus according to claim 11, wherein said optical system comprises an argon ion laser emitting object light and reference light having a wavelength of 488 nm and a helium neon laser emitting a reproducing light having a wavelength of 633 nm.

13. A hologram recording and reproducing apparatus comprising a hologram record element including a record unit formed by an optical single crystal having an optically induced refractive effect and an electrode means provided on the record unit for applying a voltage to said record unit, and an optical system for impinging light onto an incident surface of said record unit, wherein the apparatus further comprises an optically transparent and electrically insulating medium having a refractive index which differs from the refractive index of said optical single crystal by not larger than 0.50, said medium being provided at least on a side of the record medium from which the light is made incident upon the record unit, a partition made of an optically transparent and electrically insulating material, a space between said record unit and said partition being filled with said medium, a second partition at a position opposite said optical system with respect to said hologram record element, at least one anti-reflection film on a wall surface of said partition, said second partition being inclined with respect to the light impinging upon the hologram record element, and a light shielding plate being provided opposite the second partition such that external light is prevented from being incident upon the second partition and being reflected toward a viewer.

14. An apparatus according to claim 13, wherein said optical single crystal of the record unit of the hologram record element is made a (100) wafer of a photorefractive crystal, and the hologram record element is arranged such that said light is made incident upon the incident surface such that an optical axis of the incident light is inclined with respect to <100> axis of the optical single crystal by a predetermined angle θ.

15. An apparatus according to claim 14, wherein said optical single crystal of the record unit is made of a photorefractive crystal selected from the group consisting of $Bi_{12}SiO_{20}$ and $Bi_{12}GeO_{20}$.

16. An apparatus according to claim 15, wherein said medium is made of a refraction liquid contained in a vessel made of an optically transparent and electrically insulating material, and said partition is formed by a wall of said vessel.

17. An apparatus according to claim 16, wherein said medium is made of a refraction liquid selected from the group consisting of silicone oil, arsenic tripromide, disulfide/selenium compound, formulation containing selenium compound and arsenic tripromide/disulfide formulation.

18. An apparatus according to claim 15, wherein said optical system comprises an argon ion laser emitting object light and reference light having a wavelength of 488 nm and a helium neon laser emitting a reproducing light having a wavelength of 633 nm.

19. A hologram recording and reproducing apparatus comprising a hologram record element including a record unit formed by an optical single crystal having an optically induced refractive effect and an electrode means provided on the record unit for applying a voltage to said record unit, and an optical system for impinging light onto an incident surface of said record unit, wherein said record unit is made of an optical single crystal belonging to a cubic system and said incident surface is formed by a (100) surface, said light is made incident upon the incident surface such that an optical axis of the incident light is inclined with respect to <100> axis of the optical single crystal by a predetermined angle θ, and the apparatus further comprises an optically transparent and electrically insulating medium having a refractive index which differs from a refractive index of said optical single crystal by not larger than 0.50, said medium being provided at least on a side of the record medium from which the light is made incident upon the record unit, and a partition made of an optically transparent and electrically insulating material, a space between said record unit and said partition being filled with said medium.

* * * * *